(12) United States Patent
Tapia et al.

(10) Patent No.: US 8,872,697 B2
(45) Date of Patent: Oct. 28, 2014

(54) REAL TIME RECONSTRUCTION OF 3D CYLINDRICAL NEAR FIELD RADAR IMAGES USING A SINGLE INSTRUCTION MULTIPLE DATA INTERPOLATION APPROACH

(76) Inventors: Daniel Flores Tapia, Winnipeg (CA); Stephen Pistorius, Winnipeg (CA)

( * ) Notice: Subject to any disclaimer, the term of this patent is extended or adjusted under 35 U.S.C. 154(b) by 215 days.

(21) Appl. No.: 13/586,331

(22) Filed: Aug. 15, 2012

(65) Prior Publication Data

US 2013/0044022 A1    Feb. 21, 2013

Related U.S. Application Data

(60) Provisional application No. 61/525,290, filed on Aug. 19, 2011.

(51) Int. Cl.
    *G01S 13/89*    (2006.01)
    *G01V 3/12*    (2006.01)
    *G01S 13/42*    (2006.01)

(52) U.S. Cl.
    CPC .............. *G01S 13/89* (2013.01); *G01S 13/426* (2013.01)
    USPC ................ 342/180; 342/22; 342/27; 342/196

(58) Field of Classification Search
    CPC ....... G01S 13/89; G01S 13/887; G01S 13/04; G01S 13/56; G01S 13/426; G01S 7/539; G01S 7/20; G01V 3/12; A61B 5/0507; A61B 5/053; A61B 5/05; A61B 5/7257
    See application file for complete search history.

(56) References Cited

U.S. PATENT DOCUMENTS

| | | | | | |
|---|---|---|---|---|---|
| 5,170,170 | A | * | 12/1992 | Soumekh | 342/179 |
| 5,751,243 | A | * | 5/1998 | Turpin | 342/179 |
| 7,570,063 | B2 | * | 8/2009 | Van Veen et al. | 324/637 |
| 7,642,953 | B2 | * | 1/2010 | Cheng et al. | 342/179 |
| 2013/0044022 | A1 | * | 2/2013 | Tapia et al. | 342/180 |

FOREIGN PATENT DOCUMENTS

WO    WO 2013177661 A1 * 12/2013

OTHER PUBLICATIONS

Li Ping; Chu-Feng Hu; Jia-Dong Xu, "The study of three dimensional radar imaging techniques," Microwave and Millimeter Wave Technology, 2007. ICMMT '07. International Conference on , vol., No., pp. 1,4, Apr. 18-21, 2007.*

Bryant, M.L., Gostin, L.L., Soumekh, M.: '3-D E-CSAR imaging of a T-72 tank and synthesis of its SAR reconstructions,' IEEE Transactions on Aerospace and Electronic Systems, 2003, 39, (1), pp. 211-227.

(Continued)

*Primary Examiner* — John B Sotomayor
(74) *Attorney, Agent, or Firm* — Ryan W. Dupuis; Kyle R. Satterthwaite; Ade & Company Inc.

(57) ABSTRACT

The present invention uses a Single Instruction Multiple Data (SIMD) architecture to form real time 3D radar images recorded in cylindrical near field scenarios using a wavefront reconstruction approach. A novel interpolation approach is executed in parallel, significantly reducing the reconstruction time without compromising the spatial accuracy and signal to noise ratios of the resulting images. Since each point in the problem space can be processed independently, the proposed technique was implemented using an approach on a General Purpose Graphics Processing Unit (GPGPU) to take advantage of the high performance computing capabilities of this platform.

13 Claims, 52 Drawing Sheets

(56) References Cited

OTHER PUBLICATIONS

Fear, E.C., Stuchly, M.A.: 'Microwave detection of breast cancer' IEEE Transactions on Microwave Theory and Techniques, 2000, 48, (11), pp. 1854-1863.

Kaestner, A.P., Baath, L.B.: 'Microwave polarimetry tomography of wood', IEEE Sensors Journal, 2005, 5, (2), pp. 209-215.

Bond, E.J., Xu Li, Hagness, S.C., Van Veen, B.D.: 'Microwave imaging via space-time beamforming for early detection of breast cancer', IEEE Transactions on Antennas and Propagation, 2003, 51, (8), pp. 1690-1705.

Klemm, M., Craddock, I.J., Leendertz, J.A., Preece, A., Benjamin, R.: 'Radar-Based Breast Cancer Detection Using a Hemispherical Antenna Array—Experimental Results', IEEE Transactions on Antennas and Propagation, 2009, 57, (6), pp. 1692-1704.

Soumekh, M.: 'Synthetic Aperture Radar Signal Processing with MATLAB Algorithms'(Wiley-Interscience, New York City, New York, USA, 1999) pp. 198-207.

Owens, J. D., Houston, M., Luebke, D, Green, S., Stone, J. E., and Phillips, J. C.: 'GPU Computing', Proceedings of the IEEE, 2008, 96, (5), pp. 879-899.

Barber, C. B., Dobkin, D. P., and Huhdanpaa, H.:'The quickhull algorithm for convex hulls,' ACM Transactions on Mathematical Software, 1996, 22, (4), pp. 469-483.

Sorensen, T., Atkinson, D., Schaeffter, T., and Hansen, M. :'Real-time reconstruction of sensitivity encoded radial magnetic resonance imaging using a graphics processing unit,' IEEE Transactions on Medical Imaging, 2009, 28 (12), 1974-1985.

NVidia Corporation Inc.: 'CUDA C Programming Guide'(San Jose CA, 2010).

Flores-Tapia, D., Thomas, G., Sabouni, A., Noghanian, S., and Pistorius, S.: 'Breast Tumor Microwave Simulator Based on a Radar Signal Model,' IEEE International Symposium on Signal Processing and Information Technology, Vancouver, BC, Canada, Aug. 2006, pp. 1-6.

Li, D., Meaney, P. M., and Paulsen, K. D.: 'Conformal microwave imaging for breast cancer detection', IEEE Transactions on Microwave Theory and Techniques, 2003, 51 (4), 1179-1185.

* cited by examiner

REAL TIME RECONSTRUCTION OF 3D CYLINDRICAL NEAR FIELD RADAR IMAGES USING A SINGLE INSTRUCTION MULTIPLE DATA INTERPOLATION APPROACH

This application claims the benefit under 35 U.S.C. 119(e) of U.S. provisional application Ser. No. 61/525,290, filed Aug. 19, 2011.

FIELD OF THE INVENTION

The present invention relates to the use of a Single Instruction Multiple Data (SIMD) architecture to form real time 3D radar images recorded in cylindrical near field scenarios using a wavefront reconstruction approach, and more particularly, the present invention relates to an interpolation approach that is executed in parallel.

BACKGROUND

During the last three decades, subsurface radar (SR) imaging has proven to be a reliable tool for imaging and sensing a number of scenarios. This imaging technology is based on the dielectric differences between the materials that form the scan region propagation medium and the targets present inside it. In recent years, cylindrical scan trajectories have been used in some novel near field radar applications, such as Microwave Wood Inspection (MWI) and Breast Microwave Radar (BMR), because that this geometry better suits the shape of the scan regions in these situations. As the irradiation is performed along the scan trajectory, the target responses have different travel times, resulting in the formation of non-linear signatures. This makes it difficult to correctly determine the dimensions and locations of the different scattering structures present in the scan area. In order to properly visualize the targets reflections, the collected data must be focused.

A number of techniques have been proposed to reconstruct cylindrical near field radar images. In general, these methods can be classified as either time-shift techniques or wavefront reconstruction approaches. Time-shift techniques perform a shift-sum process over a set of regions of interest in the scan area. Two examples of this approach are the confocal mapping algorithm and the beamforming reconstruction method. Wavefront reconstruction approaches focus the data by processing the spectrum of the collected responses and transforming it from the spatial-temporal domain where it is originally acquired to the spatial domain where it will be displayed. Although each method has advantages and disadvantages of their own, time-shift techniques are simpler to implement and debug, while wavefront reconstruction approaches exhibit a higher Signal to Noise Ratio (SNR) and an increased focal quality.

Reference to the above can be found in the following references which are incorporated herein by reference:

i) Bryant, M. L., Gostin, L. L., Soumekh, M.: '3-D E-CSAR imaging of a T-72 tank and synthesis of its SAR reconstructions,' *IEEE Transactions on Aerospace and Electronic Systems,* 2003, 39, (1), pp. 211-227;

ii) Fear, E. C., Stuchly, M. A.: 'Microwave detection of breast cancer' IEEE Transactions on Microwave Theory and Techniques, 2000, 48, (11), pp. 1854-1863;

iii) Kaestner, A. P., Baath, L. B.: 'Microwave polarimetry tomography of wood', IEEE Sensors Journal, 2005, 5, (2), pp. 209-215;

iv) Bond, E. J., Xu Li, Hagness, S. C., Van Veen, B. D.: 'Microwave imaging via space-time beamforming for early detection of breast cancer', IEEE Transactions on Antennas and Propagation, 2003, 51, (8), pp. 1690-1705;

v) Klemm, M., Craddock, I. J., Leendertz, J. A., Preece, A., Benjamin, R.: 'Radar-Based Breast Cancer Detection Using a Hemispherical Antenna Array—Experimental Results', IEEE Transactions on Antennas and Propagation, 2009, 57, (6), pp. 1692-1704; and vi) Soumekh, M.: 'Synthetic Aperture Radar Signal Processing with MATLAB Algorithms' (Wiley-Interscience, New York City, N.Y., USA, 1999).

A problem with cylindrical radar reconstruction approaches is their execution time. Its computational complexity is in the order of $O(\bar{n} \log \bar{n})$, where $\bar{n}$ is the input signal length, resulting in execution times in the order of minutes for each scan plane when executed in a conventional multicore Pentium CPU. This can be an issue in cylindrical near field radar applications, due to the fact that a low execution time is required to provide the high throughput that is needed.

SUMMARY OF THE INVENTION

The present invention proposes the use of a Single Instruction Multiple Data (SIMD) architecture to form real time 3D radar images recorded in cylindrical near field scenarios using a wavefront reconstruction approach. In the scope of the present invention, an approach is considered to be real time if its reconstruction time is less than the data acquisition time of a range profile, which is around 5 seconds. This follows the standard definition, where a system or approach is considered to be real time if it is able to update information at the same rate as is receives data.

The proposed approach uses a novel interpolation approach that is executed in parallel, significantly reducing the reconstruction time without compromising the spatial accuracy and signal to noise ratios of the resulting images. Since each point in the problem space can be processed independently, the proposed technique was implemented using an approach on a General Purpose Graphics Processing Unit (GPGPU) to take advantage of the high performance computing capabilities of this platform. Originally used for computer graphics, GPGPU devices are being increasingly used for scientific applications due to their low cost, high memory bandwidth and enormous arithmetic capabilities as described in Owens, J. D., Houston, M., Luebke, D, Green, S., Stone, J. E., and Phillips, J. C.: 'GPU Computing', Proceedings of the IEEE, 2008, 96, (5), pp. 879-899 which is incorporated herein by reference. The performance of the proposed method was evaluated using a set of simulated and experimental data sets. The execution time, signal to noise ratio (SNR), root mean square (RMS) error and spatial accuracy of the reconstructed images were calculated in order to assess the performance of the proposed technique.

According to one aspect of the invention there is provided a method of reconstructing collected data acquired in a three dimensional cylindrical radar scan geometry in which targets are considered to be at near field distances and where the scan planes are defined along a z axis, scan locations are arranged in a circular pattern with a radius R at each plane, an irradiating antenna is facing towards a center of each scan plane, and a waveform f(t) with a prescribed bandwidth is sequentially radiated from each scan location, the method comprising:

expressing a received signal from each scan location (R, θ, z) as:

$$s(t, \theta, z) = \sum_{q=1}^{T} \sigma_q f\left(t - \frac{2D_q(\theta, z)}{v}\right)$$

where v is the propagation speed, $\sigma_q$ and $(r_p, \phi_q, z_p)$ are the reflectivity and location of the $q^{th}$ target and $D_q(\theta,z) = \sqrt{R^2 + r_q^2 + (z_q - z)^2 - 2Rr_q\cos(\phi_q - \theta)}$;

calculating a Fourier transform along the t, z and θ directions of said received signal;

applying a filter such that a resulting compensated dataset $U(\omega, \in, k_z)$ is expressed as:

$$U(\omega, \varepsilon, k_z) = \sum_{q=1}^{T} 4\sigma_q \cdot \xi(\omega, \varepsilon, k_z) \cdot \exp\left(-j\left(\sqrt{(4k^2 - k_z^2)r_q^2 - \varepsilon^2}\right) + \varepsilon \cdot \sin^{-1}\left(\varepsilon / \sqrt{(4k^2 - k_z^2)r_q^2}\right) + \varepsilon\phi_q + k_z z_q\right)$$

where $\in$ and $k_z$ are the spatial frequency counterparts of θ and z respectively and $\xi(\omega, \in, k_z)$ is the spectrum amplitude component in the $(\omega, \in, k_z)$ frequency space;

applying a mapping function to the resulting compensated dataset to produce a sampled frequency space denoted as $I(k_{ux}, k_{uy}, k_z)$;

interpolating values of $I(k_{ux}, k_{uy}, k_z)$ at points defined in $(k_x, k_y, k_z)$; and calculating a three dimensional inverse Fourier transform of $I(k_x, k_y, k_z)$ to yield a three dimensional model i(x, y, z).

The method preferably further includes transferring data from the $(\omega, \in, k_z)$ frequency space to the $(k_x, k_y, k_z)$ spatial frequency space where $k_x$ and $k_y$ are spatial frequency counterparts of x and y spatial domains.

The method preferably further includes obtaining the inverse Fourier transform of:

$$U(\omega, \varepsilon, k_z) = \sum_{q=1}^{T} 4\sigma_q \cdot \xi(\omega, \varepsilon, k_z) \cdot \exp\left(-j\left(\sqrt{(4k^2 - k_z^2)r_q^2 - \varepsilon^2}\right) + \varepsilon \cdot \sin^{-1}\left(\varepsilon / \sqrt{(4k^2 - k_z^2)r_q^2}\right) + \varepsilon\phi_q + k_z z_q\right)$$

along $\in$ yielding the spectrum denoted as $S_c(\omega, \theta, k_z)$ and performing the following mapping functions:

$$k_{ur} = \sqrt{4(\omega/v)^2 - k_z^2}$$

$$k_{ux} = k_{ur} \cdot \cos(\theta)$$

$$k_{uy} = k_{ur} \cdot \sin(\theta).$$

The method preferably further includes defining an evenly sampled frequency space $(k_x, k_y, k_z)$ as follows:

$$k_x = k_y = n\pi/R \text{ for } -N \leq n \leq N \text{ and } n \in \square; \text{ and}$$

$$k_z = m \cdot 2\pi/(M \cdot \Delta z) \text{ for } 0 \leq m \leq M-1 \text{ and } m \in \square;$$

where Δz is the space between adjacent planes the z direction.

The method preferably further includes interpolating values of $I(k_{ux}, k_{uy}, k_z)$ at points defined in $(k_x, k_y, k_z)$ by:

defining an auxiliary function $p(k_r, k_z) = \sqrt{k_r^2 + k_z^2}$ where $k_r = l \cdot 2\pi/(L \cdot \Delta t)$ for $0 \leq l \leq L-1$ and $l \in \square$ and Δt is a sampling rate of the waveform f(t);

yielding an intermediate spectrum $\overline{U}(\omega, \theta, k_z)$ by interpolating components $U(\omega, \in, k_z)$ at points specified in their corresponding $(p(k_r, k_z), k_z)$ values;

determining polar coordinates of each point in $(k_x, k_y)$; and calculating values of $\overline{U}(\omega, \theta, k_z)$ at points contained in an auxiliary discrete frequency space using an interpolation approach that considers evenly sampled data points.

According to a second aspect of the present invention there is provided a method of interpolating in the reconstruction of data acquired in a three dimensional cylindrical radar scan geometry, the method comprising:

defining an auxiliary function $p(k_r, k_z) = \sqrt{k_r^2 + k_z^2}$ where $k_r = l \cdot 2\pi/(L \cdot \Delta t)$ for $0 \leq l \leq L-1$ and $l \in \square$ and Δt is a sampling rate of a waveform f(t) radiated from a scan location of the scan geometry;

yielding an intermediate spectrum $\overline{U}(\omega, \theta, k_z)$ by interpolating components $U(\omega, \in, k_z)$ at points specified in their corresponding $(p(k_r, k_z), k_z)$ values;

determining polar coordinates of each point in $(k_x, k_y)$; and calculating values of $\overline{U}(\omega, \theta, k_z)$ at points contained in an auxiliary discrete frequency space using an interpolation approach that considers evenly sampled data points.

The method preferably further includes displaying the reconstructed data in the spatial domain.

The method preferably further includes implementing the method on a general purpose graphics processing unit.

The method preferably further includes determining the polar coordinates of each point in $(k_x, k_y)$ using the following equations:

$$\psi(k_x, k_y) = \sqrt{k_x^2 + k_y^2}; \text{ and}$$

$$\vartheta(k_x, k_y) = \begin{cases} \tan^{-1}(k_x/k_y) & \text{if } k_x > 0 \text{ and } k_y \geq 0 \\ \tan^{-1}(k_x/k_y) + 2\pi & \text{if } k_x < 0 \text{ and } k_y \geq 0 \\ \tan^{-1}(k_x/k_y) + \pi & \text{if } k_x < 0 \text{ and } k_y < 0 \\ \pi/2 & \text{if } k_x = 0 \text{ and } k_y > 0 \\ 3\pi/2 & \text{if } k_x = 0 \text{ and } k_y < 0 \\ 0 & \text{if } k_x = 0, k_y = 0 \end{cases}$$

The method preferably further includes defining the auxiliary discrete frequency space (ρ, φ) where ρ and φ exist in the ranges $\psi(k_x, k_y)$ and $\theta(k_x, k_y)$ respectively.

The method preferably further includes including applying the following mapping function:

$$I(\alpha(\rho, \phi), \beta(\rho, \phi), k_z) = \overline{U}(\rho, \phi, k_z)$$

where $\alpha(\rho, \phi) = \rho \cdot \cos(\phi)$ and $\beta(\rho, \phi) = \rho \cdot \sin(\phi)$.

The method preferably further includes regarding $I(\alpha(\rho, \phi), \beta(\rho, \phi), k_z)$ as a single plane in $I(k_x, k_y, k_z)$.

The method preferably further includes visualizing the reconstructed data by calculating the three dimensional inverse Fourier transform of $I(\alpha(\rho, \phi), \beta(\rho, \phi), k_z)$.

One embodiment of the invention will now be described in conjunction with the accompanying drawings in which:

BRIEF DESCRIPTION OF THE DRAWINGS

FIG. 3(*b*) is a diagram of the mapping process ($k_x$, $k_y$) to ($k_r$, $\theta$);

FIG. 4(*b*) is a photograph of the BMR data acquisition setup;

FIG. 5(*b*) is a coronal view of the phantom setup in experiment 1;

FIG. 5(*c*) is a sagital view of the phantom setup in experiment 1;

FIG. 5(*d*) is an axial view of the reconstructed target signature using the proposed method;

FIG. 5(*e*) is a coronal view of the reconstructed target signature using the proposed method;

FIG. 5(*f*) is an axial view of the reconstructed target signature using the Qhull approach;

FIG. 5(*g*) is a coronal view of the reconstructed target signature using the Qhull approach;

FIG. 5(*h*) is an axial view of the reconstructed target signature using the CPU-LUT approach;

FIG. 5(*i*) is a coronal view of the reconstructed target signature using the CPU-LUT approach;

FIG. 5(*j*) is an axial view of the reconstructed target signature using the confocal mapping approach;

FIG. 5(*k*) is a coronal view of the reconstructed target signature using the confocal mapping approach;

FIG. 6(*b*) is a coronal view of the phantom setup in experiment 2;

FIG. 6(*c*) is a sagital view of the phantom setup in experiment 2;

FIG. 6(*d*) is an axial view of the reconstructed target signatures using the proposed method;

FIG. 6(*e*) is a coronal view of the reconstructed target signatures using the proposed method;

FIG. 6(*f*) is an axial view of the reconstructed target signatures using the Qhull approach;

FIG. 6(*g*) is a coronal view of the reconstructed target signatures using the Qhull approach;

FIG. 6(*h*) is an axial view of the reconstructed target signatures using the CPU-LUT approach;

FIG. 6(*i*) is a coronal view of the reconstructed target signatures using the CPU-LUT approach;

FIG. 6(*j*) is a coronal view of the reconstructed target signatures using the confocal mapping approach;

FIG. 6(*k*) is a coronal view of the first reconstructed target signatures using the confocal mapping approach;

FIG. 6(*l*) is a coronal view of the second reconstructed target signatures using the confocal mapping approach;

FIG. 7(*b*) is a coronal view of the phantom setup in experiment 3;

FIG. 7(*c*) is a sagital view of the phantom setup in experiment 3;

FIG. 7(*d*) is an axial view of the reconstructed first target signature using the proposed method;

FIG. 7(*e*) is a coronal view of the reconstructed first target signature using the proposed method;

FIG. 7(*f*) is an axial view of the reconstructed second target signature using the proposed method;

FIG. 7(*g*) is a coronal view of the reconstructed second target signature using the proposed method;

FIG. 7(*h*) is an axial view of the reconstructed first target signature using the Qhull approach;

FIG. 7(*i*) is a coronal view of the reconstructed first target signature using the Qhull approach;

FIG. 7(*j*) is an axial view of the reconstructed second target signature using the Qhull approach;

FIG. 7(*k*) is a coronal view of the reconstructed second target signature using the Qhull approach;

FIG. 7(*l*) is an axial view of the reconstructed first target signature using the CPU-LUT approach;

FIG. 7(*m*) is a coronal view of the reconstructed first target signature using the CPU-LUT approach;

FIG. 7(*n*) is an axial view of the reconstructed second target signature using the CPU-LUT approach;

FIG. 7(*o*) is a coronal view of the reconstructed second target signature using the CPU-LUT approach;

FIG. 7(*p*) is an axial view of the reconstructed target signatures using the confocal mapping approach;

FIG. 7(*q*) is a coronal view of the reconstructed first target signature using the confocal mapping approach;

FIG. 7(*r*) is a coronal view of the reconstructed second target signature using the confocal mapping approach;

FIG. 8(*b*) is a reconstructed model from the data collected in experiment 4 using the proposed method;

FIG. 8(*c*) is a reconstructed model from the data collected in experiment 4 using the Qhull approach;

FIG. 8(*d*) is a reconstructed model from the data collected in experiment 4 using the CPU-LUT version of the proposed method; and FIG. 8(*e*) is a reconstructed model from the data collected in experiment 4 using the confocal mapping approach.

In the drawings like characters of reference indicate corresponding parts in the different figures.

DETAILED DESCRIPTION

Cylindrical SR Imaging.
Signal Model

Let us consider a cylindrical scan geometry with M scan planes defined along the z axis and N scan locations arranged in a circular pattern with a radius R at each plane. The irradiating antenna is facing towards the center of the scan plane. T point scatters are assumed to be inside the area delimited by the scan geometry. A waveform f(t) with a bandwidth B, is sequentially radiated from each scan location and the responses from the targets with the scan area are recorded at the same position. This signal is considered to have a length of L samples. For the scan location at (R, $\theta$, z), the received signal can be expressed as:

$$s(t, \theta, z) = \sum_{q=1}^{T} \sigma_q f\left(t - \frac{2D_q(\theta, z)}{v}\right) \quad (1)$$

where v is the medium propagation speed, $\sigma_q$ and ($r_p$, $\phi_q$, $z_p$) are the reflectivity and polar coordinates of the $q^{th}$ target, and $D_q(\theta, z) = \sqrt{R^2 + r_q^2 + (z_q - z)^2 - 2Rr_q\cos(\phi_q - \theta)}$.

Figure 1:
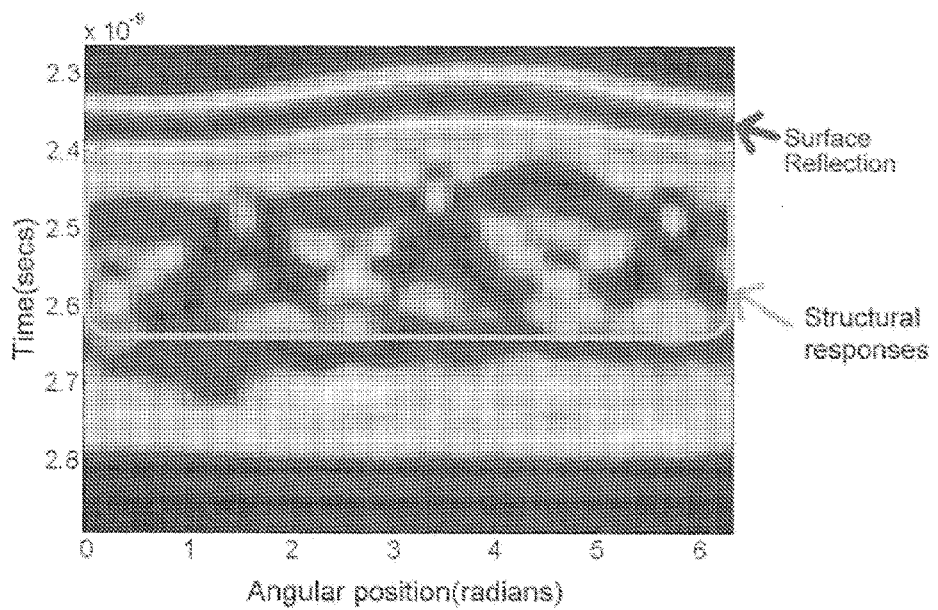
FIG. 1 is an unprocessed 2D image from an experimental data set containing a single target.

In cylindrical SR scenarios, target reflections present non-linear signatures due to the different signal travel times along the different scan locations and the near field distances between the targets and the scan geometry. As illustrated in FIG. 1, this makes difficult to assess the locations and dimensions of the targets present in the scan area. To properly assess the target dimensions and locations, the data must be reconstructed. An effective way of doing this is by using wavefront reconstruction as described in Soumekh, M. noted above. To use this approach, the first step is to calculate the Fourier transform of (1) along the t, z and θ directions and compensate for the phase and magnitude effects of the scan geometry. By using the mathematical procedure described in Owens, J. D., Houston, M., Luebke, D, Green, S., Stone, J. E., and Phillips, J. C. noted above to compensate for the compensated dataset, $U(\omega, \in, k_z)$, is given by:

$$U(\omega, \varepsilon, k_z) = \sum_{q=1}^{T} 4\sigma_q \cdot \xi(\omega, \varepsilon, k_z) \cdot \exp\left(-j\left(\sqrt{(4k^2 - k_z^2)r_q^2 - \varepsilon^2}\right) + \varepsilon \cdot \sin^{-1}\left(\varepsilon / \sqrt{(4k^2 - k_z^2)r_q^2}\right) + \varepsilon\phi_q + k_z z_q\right) \quad (2)$$

where $\in$ and $k_z$ are the spatial frequency counterparts of θ of z respectively, k is the wavenumber, $\omega=2\pi f$, and $\xi(\omega, \in, k_z)$ is the spectrum amplitude component in the $(\omega, \in, k_z)$ frequency space.

The next step is to transfer the data from $U(\omega, \in, k_z)$ to the $(k_x, k_y, k_z)$ spatial frequency space, where $k_x$ and $k_y$ are the spatial frequency counterparts of x and y spatial domains. First, a magnitude filter given by $\sqrt{\in^2/\sqrt{(4k^2-k_z^2)R^2-\in^2}}$ is applied to $U(\omega, \in, k_z)$. This filter was derived using the stationary phase principle described in Soumekh, M. noted above and it is used to compensate for the variable density of the polar frequency space when it is mapped into the Cartesian frequency space. Next, the inverse Fourier transform of (2) is along $\in$ is calculated, yielding a function denoted as $S_c(\omega, \theta, k_z)$, and the following mapping functions are used as supported in Owens, J. D., Houston, M., Luebke, D, Green, S., Stone, J. E., and Phillips, J. C. noted above:

$$k_{ur} = \sqrt{4(\omega/v)^2 - k_z^2} \quad (3)$$

$$k_{ux} = k_{ur} \cdot \cos(\theta) \quad (4)$$

$$k_{uy} = k_{ur} \cdot \sin(\theta) \quad (5)$$

These mappings produce an unevenly sampled frequency space, denoted as, $I(k_{ux}, k_{uy}, k_z)$ because the separation between adjacent samples in k, $k_z$ and θ is constant. Nevertheless, conventional FFT techniques present limitations when it comes to process this kind of frequency space as described in Soumekh, M. noted above. In order to process the compensated data using standard Fourier methods, the evenly sampled frequency space, $(k_x, k_y, k_z)$, is defined as follows:

$$k_x = k_y = n\pi/R \text{ for } -N \leq n \leq N \text{ and } n \in \square \quad (6)$$

$$k_z = m \cdot 2\pi/(M \cdot \Delta z) \text{ for } 0 \leq m \leq M-1 \text{ and } m \in \square \quad (7)$$

where Δz is the distance between adjacent scan planes. Next, the evenly sampled spectrum $I(k_x, k_y, k_z)$ is obtained by interpolating the values of $I(k_{ux}, k_{uy}, k_z)$ at the points defined in $(k_x, k_y, k_z)$. Finally, the 3D inverse Fourier transform of $I(k_x, k_y, k_z)$, is calculated, yielding the the 3D model i(x, y, z). A more detailed explanation of the 3D cylindrical holographic reconstruction technique is given in Owens, J. D., Houston, M., Luebke, D, Green, S., Stone, J. E., and Phillips, J. C. noted above.

Interpolation of Unevenly Sampled Spaces

The most computationally intensive portion of the 3D wavefront reconstruction approach is the interpolation process. In non evenly sampled frequency spaces, the interpolation procedure is performed using a series of triangulation operations in which the values of $(k_{ux}, k_{uy})$ and $(k_{ur}, k_z)$ spaces are used to determine the basis that will be used to calculate each element in $(k_x, k_y, k_z)$. This approach is also known as Qhull interpolation.

In reference to Barber, C. B., Dobkin, D. P., and Huhdanpaa, H.: 'The quickhull algorithm for convex hulls,' ACM Transactions on Mathematical Software, 1996, 22, (4), pp. 469-483, which is incorporated herein by reference, the Qhull method can be described as follows. Consider the 2D case that leads to the formation of each $(k_x, k_y)$ plane, where we define a set $\{P_1, P_2, P_3, \ldots, P_i, \ldots, P_\gamma\}$. $P_i$ is the $i^{th}$ ordered pair in each $(k_{ux}, k_{uy})$ plane and $\gamma = L \cdot N$. A triangulation φ is a set of A triples of points $(P_a, P_b, P_c)$, where a,b,c $\in \{1,2,3,\ldots,\gamma\}$ and $(P_a, P_b, P_c)$ are pairwise distinct such that for each triple, the corresponding points are the vertices of a triangle with the properties that each such triangle contains only those three points of P and those are the vertices, that the intersection of the interiors of any two triangles is empty, and that the unions of those triangles is the complex hull of P. For any set of points, there are almost always several triangulations. To optimize this topological process, a Delaunay triangulation algorithm is often used. This approach optimizes the triangulation process by evaluating the smallest angle in each of the possible triangulations present in the evaluated set. This algorithm is described in detail in Barber, C. B., Dobkin, D. P., and Huhdanpaa, H. as noted above. After this step, various interpolation bases can be used to generate a function $I(k_x, k_y, k_z)$ that describes the behavior of the data contained in $(k_{ux}, k_{uy})$ over the frequency values defined in $(k_x, k_y)$. A 3D generalization of this approach is used to generate $I(k_x, k_y, k_z)$ the from $U(\omega, \in, k_z)$.

Another possible approach to generate evenly sampled spectra from unevenly sampled spaces is by using the inverse non uniform inverse $FFT(NFFT^H)$. This technique performs a convolution process using a predefined kernel in the frequency domain to generate the equidistant samples from a set of non evenly sampled locations. After this estimation is performed, the inverse FFT of the evenly sampled dataset is calculated. Finally, a deapodization step is performed using the time domain representation of the kernel in order to eliminate its effect. $NFFT^H$ approaches have been widely used for a several reconstruction problems, ranging from magnetic resonance imaging to ultrasound tomography. This is described in Sorensen, T., Atkinson, D., Schaeffter, T., and Hansen, M.: 'Real-time reconstruction of sensitivity encoded radial magnetic resonance imaging using a graphics processing unit,' IEEE Transactions on Medical Imaging, 2009, 28 (12), 1974-1985 which is incorporated herein by reference. This technique yields images with a comparable accuracy and focal quality when compared with Qhull approaches when used to form radar images.

SIMD Interpolation Description

Qhull approaches have an expected performance of $O(\bar{n} \log \bar{n})$, which in cylindrical SR imaging applications usually results in execution times of 35 seconds to 1 minute per imaging plane when executed on a standard Pentium multicore CPU. The interpolation procedure is the most computationally intensive portion of the reconstruction process as the rest of the reconstruction takes less than 1% of the execution time. The order of complexity of this operation is on the same order as the FFT, but the additional execution time is caused by the fact that the number of samples in $(k_x, k_y, k_z)$, $(2(L-1)+1)^2 \cdot M$, is generally much higher than the number of elements in the $(\omega, \theta, k_z)$ space, because in the majority of the radar systems L>>N. In the other hand, NFFT$^H$ approaches have also a complexity in the order of $O(\bar{n} \log(\bar{n})+\bar{m})$, where $\bar{m}$ is the number of points in the original dataset. Although these approaches can be parallelized to increase the data throughput, they have only been tested on datasets smaller (512×512 samples) than the ones found in radar imaging scenarios and they are only used for 2D resampling along each imaging plane. Further investigation is required to optimize the use of these techniques for 3D cylindrical SR reconstruction.

In order to reduce the execution time of the reconstruction process, a SIMD approach is proposed in this paper. SIMD programming models are used to parallelize computationally expensive procedures in order to reduce its execution time. SIMD approaches can be easily implemented in GPGPU devices, which are quite effective to tackle problems that require a large number of interpolation operations since they use specialized hardware for this purpose. GPGPU devices process several data elements in parallel using different threads running the same program, which we will refer to as a kernel. A full description of the capabilities of GPGPU computing is well beyond the scope of this paper, we will only address the key points of the implementation of the proposed approach on the GPGPU platform.

Current GPGPU interpolation procedures are designed to work only on evenly separated spaces. This fact, in addition to its high number of branching operations, thus makes the implementation of the Qhull approach on a GPGPU platform very difficult. In order to take advantage of the GPU computing capabilities, an interpolation approach that works over an evenly spaced grid must be used. Let consider the a discrete $(2(L-1)+1) \times (2(L-1)+1) \times M$ frequency space $(k_x, k_y, k_z)$ as defined in (6) and (7). According to the inversion technique described in section 2, after the effects of the scan geometry are compensated, the collected data must be transferred from the $(\omega, \theta, k_z)$ to the $(k_x, k_y, k_z)$ space. To migrate the responses from each $(\omega, k_z)$ plane to their corresponding $(k_r, k_z)$ space using an interpolation approach that considers an evenly sampled space, we will first define an auxiliary function:

$$p(k_r, k_z) = \sqrt{k_r^2 + k_z^2} \tag{8}$$

$$k_r = l \cdot 2\pi/(L \cdot \Delta t) \text{ for } 0 \leq l \leq L-1 \text{ and } l \in \square \tag{9}$$

where $\Delta t$ is the sampling rate of f(t). At this point, the value of the $U(\omega, \in, k_z)$ along the evenly sampled points defined by $(k_r, k_z)$ can calculated by interpolating over the components $U(\omega, \in, k_z)$ at the points specified in their corresponding $(p(k_r, k_z), k_z)$ values, since data points in $(\omega, \theta, k_z)$ are evenly sampled, yielding the intermediate spectrum $\overline{U}(\omega, \theta, k_z)$. Next, the polar coordinates of each point in $(k_x, k_y)$ can be calculated as follows:

$$\psi(k_x, k_y) = \sqrt{k_x^2 + k_y^2} \tag{10}$$

$$\vartheta(k_x, k_y) = \begin{cases} \tan^{-1}(k_x/k_y) & \text{if } k_2 > 0 \text{ and } k_y \geq 0 \\ \tan^{-1}(k_x/k_y) + 2\pi & \text{if } k_x < 0 \text{ and } k_y \geq 0 \\ \tan^{-1}(k_x/k_y) + \pi & \text{if } k_x < 0 \text{ and } k_y < 0 \\ \pi/2 & \text{if } k_x = 0 \text{ and } k_y > 0 \\ 3\pi/2 & \text{if } k_x = 0 \text{ and } k_y < 0 \\ 0 & \text{if } k_x = 0, k_y = 0 \end{cases} \tag{11}$$

We can now define the auxiliary discrete frequency space $(\rho, \phi)$ where $\rho$ and $\phi$ are the ranges of $\psi(k_x, k_y)$ and $\theta(k_x, k_y)$ respectively. The values of $\overline{U}(\omega, \theta, k_z)$ at the points contained in $(\rho, \phi)$ can be calculated by using a interpolation approach that considers evenly sampled data points. This set of values will be denoted as $S_c(\rho, \phi)$. Next, we can map $\overline{U}(\omega, \theta, k_z)$ into the $(k_x, k_y, k_z)$ frequency space using the following function:

$$I(\alpha(\rho, \phi), \beta(\rho, \phi), k_z) = \overline{U}(\rho, \phi, k_z) \tag{12}$$

where:

$$\alpha(\rho, \phi) = \rho \cdot \cos(\phi) \tag{13}$$

$$\beta(\rho, \phi) = \rho \cdot \sin(\phi) \tag{14}$$

Figure 2:
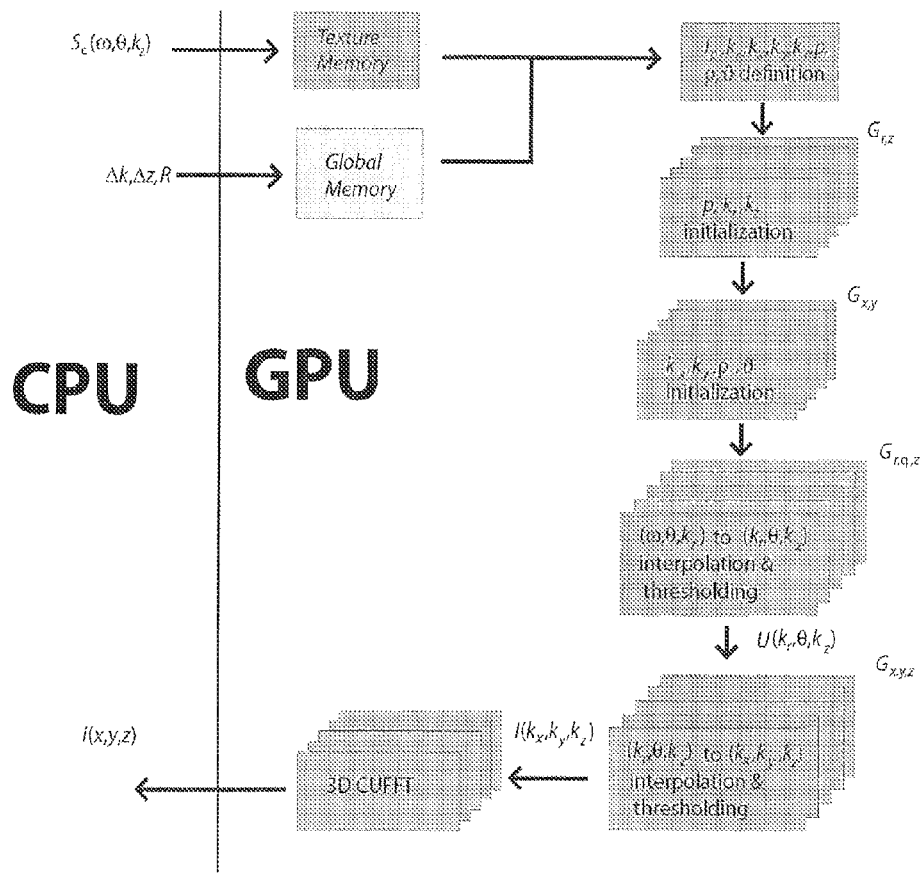
FIG. 2 is a flow diagram of the proposed 3D GPU interpolation algorithm.

Since (11) is the inverse of the mapping process described in (4) and (5), and both relations have a one to one relation, it is not difficult to prove that the $\alpha(\rho, \phi)$ and $\beta(\rho, \phi)$ map the points in $(\rho, \phi)$ back into each $(k_x, k_y)$ plane, therefore $I(\alpha(\rho, \phi), \beta(\rho, \phi), k_z)$ can be regarded as a single plane in $I(k_x, k_y, k_z)$ and it does not have any gaps within its spectral support band. Finally, the 3D IFFT of $I(\alpha(\rho, \phi), \beta(\rho, \phi), k_z)$ is calculated to properly visualize the reconstructed data in the spatial domain. An illustration of how the proposed interpolation approach is shown in FIG. 2. In this diagram, the location of random samples in the $(k_x, k_y)$ and $(k_r, k_z)$ planes is shown using different colors. Notice how their corresponding locations in the $(k_r, \theta)$ and $(\omega, k_z)$ spaces do not fall exactly into a particular cell. The location of the samples that are more likely to interpolate their values is denoted using a lighter version of the sample colors.

Implementation

Each location on the $(k_x, k_y, k_z)$ and $(k_r, k_z)$ frequency spaces is processed using an individual kernel. Due to the size of the problem domain, the global, constant and texture memory structures of the GPGPU were used. The main reason that a GPGPU platform was chosen as the computing platform for the proposed approach is that the texture memory in this kind of devices is able to perform a significantly fast linear or nearest neighbor interpolation fitting. This is supported in NVidia Corporation Inc.: 'CUDA C Programming Guide' (San Jose Calif., 2010) which is incorporated herein by reference. Contrary to the other memory modules, CUDA allows the user to use floating numbers to address the elements residing in the texture memory, also known as textels. When a fetch to a non-integer address is performed, the returned value is the result of the interpolation between the textels closer to the requested address as described in NVidia Corporation Inc.: 'CUDA C Programming Guide' (San Jose Calif., 2010) noted above. This property is used by the proposed method to perform the interpolation processes over the $(k_x, k_y)$ and $(k_r, k_z)$ planes.

The execution of the proposed method in a GPU platform can be described step by step as follows:

1. Transfer the values of $S_c(\omega, \theta, k_z)$ from host to the device texture memory, and the values of $\Delta k = 2\pi/(L \cdot \Delta t)$, $\Delta z$ and R from device constant memory.

2. The variables $I, k_x, k_y, \rho, \phi, \psi, k_z, k_r, U$ and $p$ are then defined in the GPU global memory.

3. A kernel is executed over a grid with L×M threads, $G_{r,z}$ to initialize the values of $k_z, k_r$ and $p(k_r(g_r), k_z(g_z))$ as follows:

$$k_r(g_r) = g_r \cdot \Delta k \tag{15}$$

$$k_z(g_z) = g_z \cdot 2\pi/(M \cdot \Delta z) \tag{16}$$

$$p(k_r(g_r), k_z(g_z)) = \sqrt{k_r(g_r)^2 + k_z(g_z)^2} \tag{17}$$

$\forall (g_r, g_z) \in G_{r,z}$ where $g_r$ and $g_z$ are the column and row indexes of the $g^{th}$ element of $G_{r,z}$, and:

$$g_r = n_r \in \square \text{ and } 0 \leq n_r \leq L-1 \tag{18}$$

$$g_z = n_z \in \square \text{ and } 0 \leq n_z \leq M-1 \tag{19}$$

This definition of $k_r(g_r)$ and $k_z(g_z)$ is equivalent to the one given in (8) and (10) by making the index substitutions $g_r=l$ and $g_z=m$.

4. The locations of each sample in the $(k_x, k_y)$ space are initialized using a kernel that is executed over a grid containing $(2(L-1)+1) \times (2(L-1)+1)$ threads, $G_{x,y}$. This kernel performs the following operations:

4 a). Determines the values of $k_x$ and $k_y$ using the following expressions:

$$k_x(g_x) = (g_x - N) \cdot \pi / R \qquad (20)$$

$$k_y(g_y) = (g_y - N) \cdot \pi / R \qquad (21)$$

$\forall (g_x, g_y) \in G_{x,y}$, where $g_x$ and $g_y$ are the column and row indexes of the $g^{th}$ element of $G_{x,y}$, and:

$$g_x = n_x \in \square \text{ and } 0 \le n_x \le 2(L-1) \qquad (22)$$

$$g_y = n_y \in \square \text{ and } 0 \le n_y \le 2(L-1) \qquad (23)$$

The previous definition of $k_x(g_y)$ and $k_y(g_y)$ is equivalent to the one given in (6) by making the index substitutions $g_x$ or $g_y$ equal to n.

4 b). Calculates the values of $\rho$, $\phi$ from the values of $k_x(g_y)$ and $k_y(g_y)$ using (9) and (10):

$$\rho(k_x(g_x), k_y(g_y)) = \psi(k_x(g_x), k_y(g_y))$$

$$\phi(k_x(g_x), k_y(g_y)) = \theta(k_x(g_x), k_y(g_y))$$

$$\forall (g_x, g_y) \in G_{x,y}. \qquad (24)$$

5. A kernel is executed on a grid containing $L \times M \times N$ threads, $G_{r, \theta, y}$. This kernel performs the two tasks:

5 a). Interpolate the values of $U(p(k_r(g_r), k_z(g_z)), \theta(g_\theta), k_z(g_z))$, where $g_\theta = n_\theta \in \square$ and $0 \le n_\theta \le N-1$, by performing a texture memory fetch from $S_c(\omega, \theta, k_z)$ for each $(g_r, g_\theta)$ component in $G_{r, \theta, y}$ using their corresponding $p(k_r(g_r), k_z(g_z))$ values as addresses.

5 b). Perform a thresholding process to each element in as $U(p(k_r(g_r), k_z(g_z)), \theta(g_\theta), k_z(g_z))$ follows:

$$U(p(k_r(g_r), k_z(g_z)), \theta(g_\theta), k_z(g_z)) = \qquad (25)$$
  $$\begin{cases} U(p(k_r(g_r), k_z(g_z)), & \text{if } U(p(k_r(g_r), k_z(g_z)), \\ \theta(g_\theta), k_z(g_z))) & \theta(g_\theta), k_z(g_z)) \le 2k_{max} \\ 0 & \text{otherwise} \end{cases}$$

where $k_{max} = \Delta k(L-1)$.

6. Interpolate the values in each $(k_x, k_y)$ plane using a kernel on a grid with $2(L-1)+1 \times 2(L-1)+1 \times M$ threads, $G_{x, y, z}$. This kernel performs two operations:

6 a) Interpolate the values of $I(k_x(g_x), k_y(g_y), k_z(g_z))$ by performing a texture memory fetches from $U(p(k_r(g_r), k_z(g_z)), \theta(g_\theta), k_z(g_z))$ using the corresponding values $\rho(k_x(g_x), k_y(g_y))$ and $\phi(k_x(g_x), k_y(g_y))$ of each element in $G_{x, y, z}$.

6 b) Apply a thresholding criterion to each element in as follows:

$$I(k_x(g_x), k_y(g_y), k_z(g_z)) = \qquad (26)$$
  $$\begin{cases} I(k_x(g_x), k_y(g_y), k_z(g_z)) & \text{if } I(k_x(g_x), k_y(g_y), k_z(g_z)) \le 2k_{max} \\ 0 & \text{otherwise} \end{cases}$$

7. The 3D IFFT of $I(k_x(g_x), k_y(g_y), k_z(g_z))$ is calculated and the result is then transferred to the host memory for further processing.

Figure 3A:
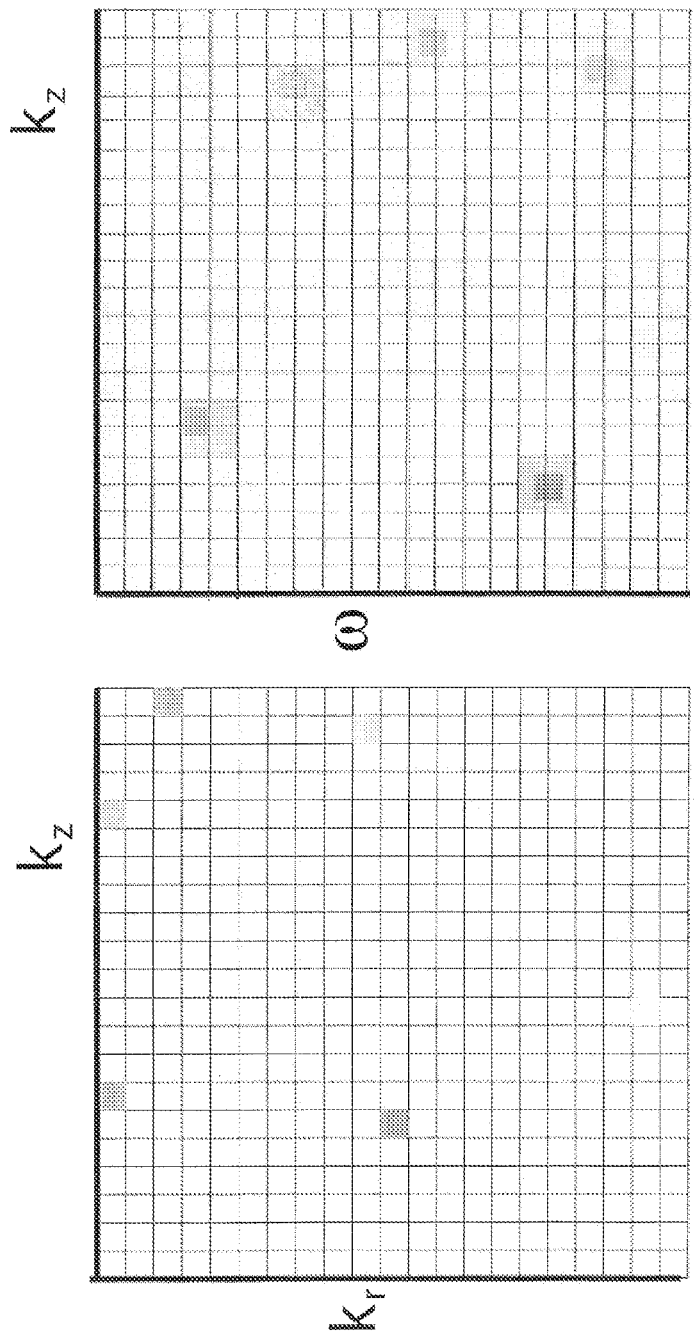
FIG. 3(*a*) is a diagram of the mapping process ($k_r$, $k_z$) to ($\omega$, $k_z$)
Figure 3B:
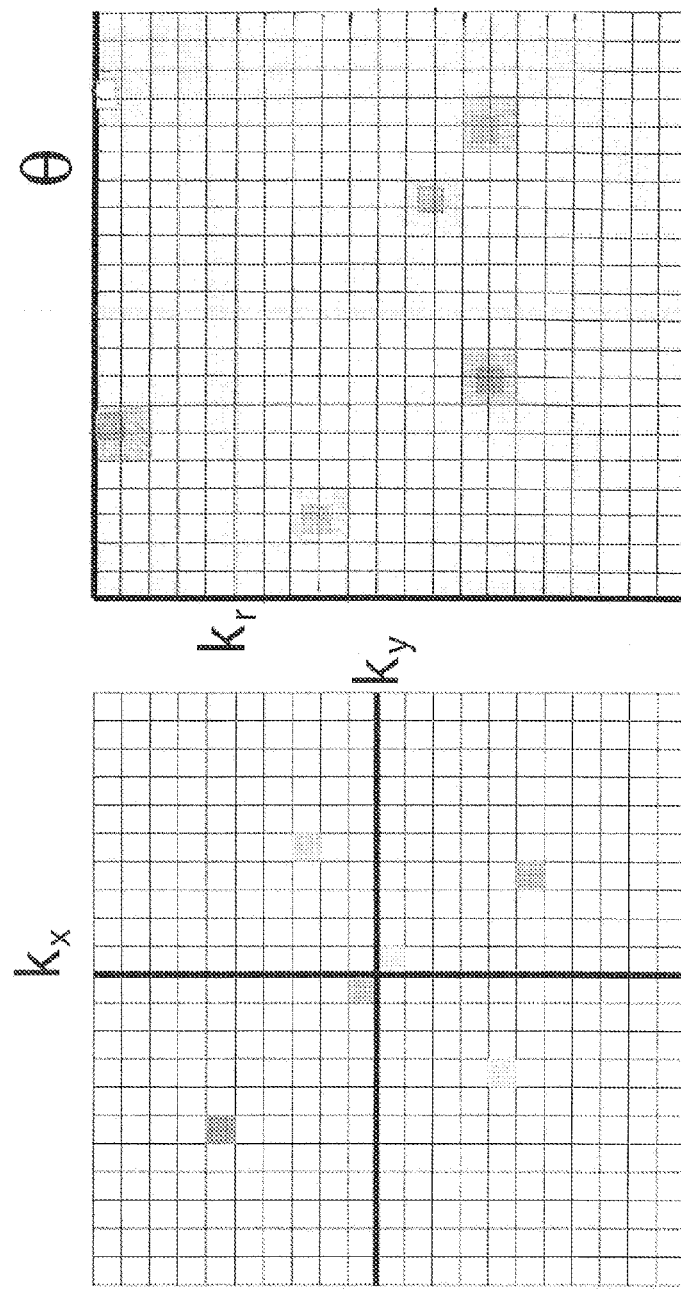

A flow diagram of this process is displayed in FIG. 3.

Simulation and Experimental Setup

The performance of the proposed method was assessed using both simulated and experimental data sets. The simulated data sets were generated using the radar simulator proposed by the authors in Flores-Tapia, D., Thomas, G., Sabouni, A., Noghanian, S., and Pistorius, S.: 'Breast Tumor Microwave Simulator Based on a Radar Signal Model,' IEEE International Symposium on Signal Processing and Information Technology, Vancouver, BC, Canada, August 2006, pp. 1-6 which is incorporated herein by reference. The accuracy of this simulation technique on high contrast scenarios has been proved using Finite Difference Time Domain simulation techniques. The datasets had four different sizes 127×72×11, 251×72×11, 501×150×16 and 1001×150×16 points and contained white Gaussian noise with a power of −70 dBm. A Stepped Frequency Continuous Wave (SFCW) with a bandwidth 11 GHz (center frequency of 6.5 GHz) and a power of 0 dBm was used as the radiated waveform. In these simulated data sets, the radius of the scan region was 10 cm for the 127×72×11 and 251×72×11 datasets and 15 cm for the rest. The number of targets was randomly assigned between one and five.

The experimental data in the first three experiments was collected using the SFCW radar system. The system consists on a 360B Wiltron Vector Network Analyzer(VNA) and an AEL H horn antenna with a length of 19 cm and a width of 12 cm. These devices emulate the emission of a narrow pulse by performing radiating different continuous waves at different harmonic frequencies. The phase differences between the irradiated and received waves are measured, yielding a phase modulated wave that is the frequency counterpart of the range profile. Compared to pulse systems, VNAs have a higher bandwidth flexibility and generate more power per cycle. This antenna is mounted on a custom automated mechanism in which the phantom is rotated to emulate a cylindrical scan geometry. A SFCW with a bandwidth of 11 GHz (1-12 GHz) was used in the first three experiments. The system was characterized by recording the antenna responses inside an anechoic chamber. This reference signal was subtracted from the experiment data in order to eliminate distortions introduced by the system components. The data acquisition setup was surrounded by electromagnetic wave absorbing material in order to reduce undesirable environment reflections. To assess the performance of the proposed approach in scenarios were a lower dielectric contrast is present, a fourth experiment was performed using a preclinical BMR data acquisition system. This system was formed by a plexiglass tank of 56×56×40 cm with a Vivaldi antenna attached to its posterior wall. This tank was filled using canola oil to provide an impedance matching between the antenna and the breast phantom. A Vivaldi antenna was connected to the VNA via a 50Ωcable. This antenna was manufactured using 2 layers of Arlon-Diclad 527 with permittivity 2.65 and loss tangent of 0.0022. The antenna was mounted into a waterproof acrylic mounting structure. A polyethylene reservoir was placed under the tank as a safety measure to prevent any accidental oil spills. Due to the properties of the antenna, which has a support band of 1 to 6 GHz, a SFCW of 5 GHz with a center frequency of 3.5 GHz was used in this setup.

The data was reconstructed using a 2.66 GHz PC with Intel i7 processor with 12 GB RAM and two Nvidia Tesla C1060 GPUs using Microsoft Visual Studio 7.0 C++ as the development environment. Two versions of the proposed GPGPU algorithm were implemented. The first version used only one Tesla device while the second one used both GPU cards. To assess the performance of the proposed technique when executed on a standard Intel Pentium multicore processor, a CPU version of the proposed approach version was implemented using a conventional Lookup Table (LUT) interpolation approach to emulate the texture memory fetch operation. This technique has a computational complexity of O(n). In all the implementations, the NVidia CUFFT library is used to calculate the Fourier transform of the processed datasets. The average transfer time between the host and the device memory for the GPGPU platform was 5.01 msec.

Figure 4A:
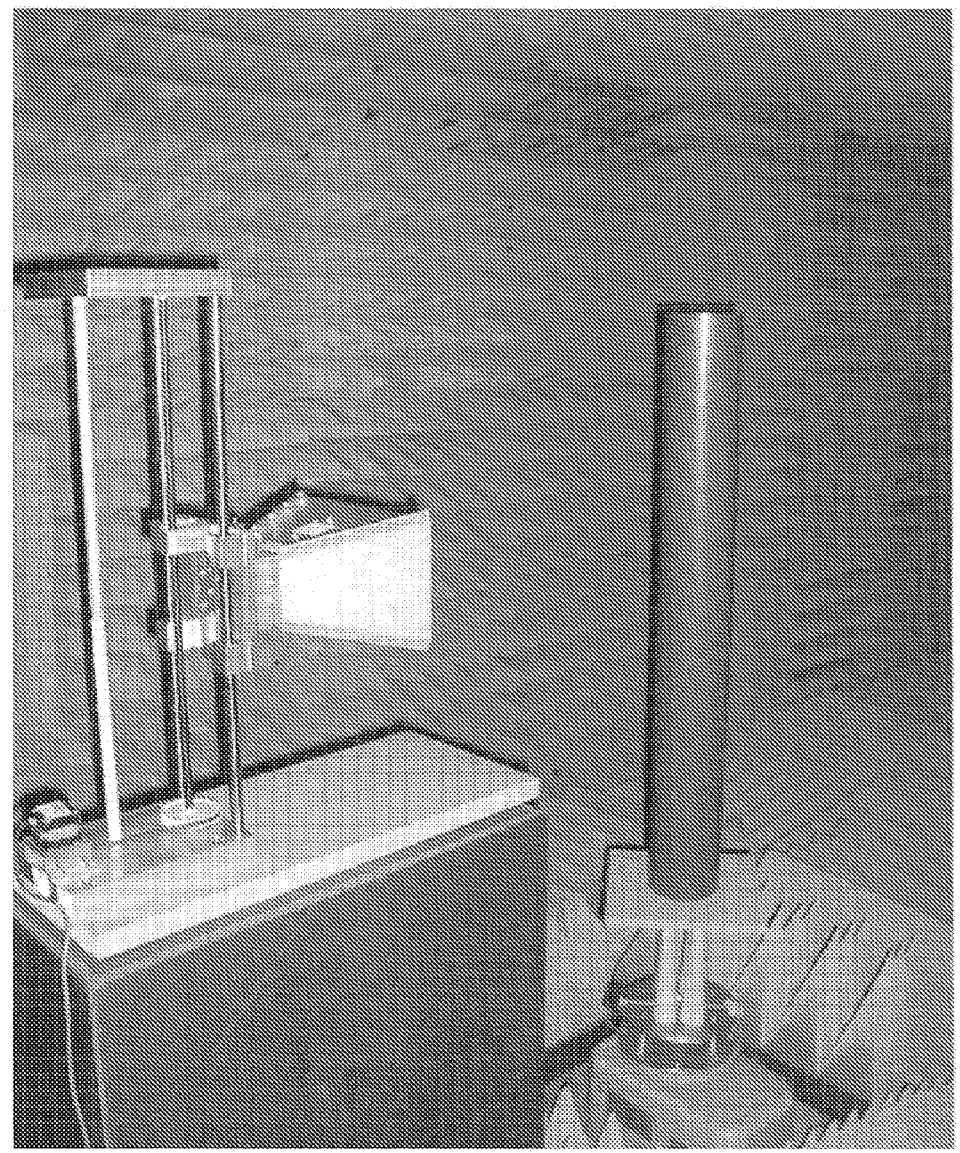
FIG. 4(*a*) is a photograph of the 3D SR data acquisition setup.
Figure 4B:
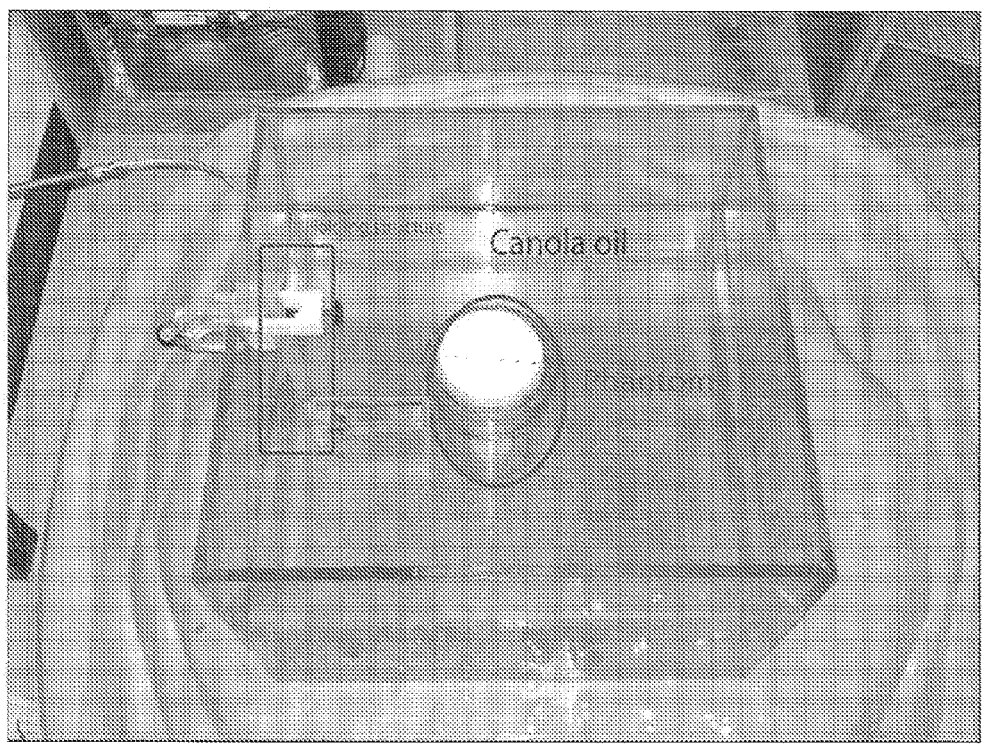

The phantom used in the first three experiments consisted on a Polyvinyl Chloride (PVC) pipe filled with synthetic foam disks. The PVC pipe has an inner diameter of 10 cm and its length is 90 cm. Aluminum ovoids were used as targets. The length of the ovoids minor and major axis were 1.2 cm and 3 cm respectively. The phantom materials present almost no variation in their dielectric permittivity values in the 1-12 GHz frequency range. The final experiment was collected using a phantom whose dielectric properties mimic the average values of human breast tissues. The scan region is formed by glycerin stored inside a styrene-nitril cylinder with a diameter of 13 cm, and the synthetic tumor was formed by a mixture of 85% saline and 15% fructose injected inside a semi-spherical capsule with a diameter of 7 mm. Canola was used as matching medium. The skin layer was created by covering the container with a 2 mm layer of a mixture formed corn syrup and agar gel described in Li, D., Meaney, P. M., and Paulsen, K. D.: 'Conformal microwave imaging for breast cancer detection', IEEE Transactions on Microwave Theory and Techniques, 2003, 51 (4), 1179-1185 which is incorporated herein by reference. To simulate the average dielectric properties of fibroglandular structures, a mixture of 50% wheat flour and 50% saline was used. A melamine coat was used to keep the glycerine from mixing with the fibroglandular tissue mixture. To assess if this coat modified the responses from the wheat-saline mixture, two ovoids with a diameter of 3.5 cm and a height of 4 cm were fabricated and one of them was covered using the waterproof coat. A set of 30 scans was collected using for each ovoid at different locations within the phantom and it was found that the coat did not significantly affect the responses of the simulated fibroglandular tissues. The dielectric permittivity values of the materials used in the support base and the phantoms are shown in Table I. A photograph of both data acquisition setups can be seen in FIG. 4.

The data collected from four experimental setups was used to determine the feasibility of the proposed approach and assess its spatial accuracy and image quality compared to the Qhull approach. The experimental data acquisition process was performed by rotating the phantom at 5° intervals for a total of 72 positions. In the first three experiments, the distance between the antenna and the center of the phantom was set to 70 cm in order to allow the antenna footprint to illuminate the entire phantom and reduce undesirable interferences of antenna early time artifacts. Along the z axis, the data was acquired using 15 scan planes with a separation of 1 cm. In the fourth experiment, the distance between the antenna and the center of the phantom was 20 cm. In this scenario, the early time responses are not as strong as the conductivity of the propagation medium (0.035 S/m) introduces higher losses than air. The fourth experiment had only one scan plane, as the current preclinical data acquisition system is only capable of acquiring 2D images.

The performance of the proposed method was quantitatively assessed by calculating the spatial accuracy, SNR and RMS error values of the reconstructed images. The spatial accuracy was determined by calculating the difference between the target location and the centroids of their signatures in the reconstructed images. The SNR of the reconstructed datasets was calculated as follows:

$$SNR = 20 \cdot \log_{10}\left(\sum_{q=1}^{T} \Gamma_{q,3dB} / (T \cdot \overline{\sigma}^w)\right) \qquad (27)$$

where $\Gamma_{q,3\ dB}$ is the magnitude of the 3 dB point of the $q^{th}$ target signature in the 3D model generated by the each algorithm and $\overline{\sigma}^w$ is the standard deviation of the background noise. In the following discussion, the center of the phantom will be denoted as the origin, and the images show the normalized energy of the reconstructed data.

The data collected from four experimental setups was used to determine the feasibility of the proposed approach compared to the Qhull approach, its CPU-LUT counterpart and the current standard technique for cylindrical SR image reconstruction, confocal mapping. In all the experiments, the separation between the targets was at least equal to twice the value of the spatial resolution along the range direction. In the following discussion, the images formed by the single GPU implementation are shown, as no qualitative or SNR and spatial accuracy differences could be found between the two GPU versions of the proposed method.

Results and Discussion

First, the performance of the proposed approach was evaluated using four groups of 30 simulated datasets. Each group corresponded to one of the four sizes previously mentioned, 127×72×11, 251×72×11, 501×150×16 and 1001×150×16 points. The datasets were reconstructed using the single and dual GPGPU versions of the proposed approach. Additionally, to compare the performance of the proposed method against conventional CPU based interpolation procedures, the data was processed using a CPU version of the proposed method and a wavefront reconstruction approach that used the Qhull approach. The resulting execution times are shown in Table II. All the execution times reported in this work include the transfer time between the GPU and the CPU. Notice how the execution time of the GPGPU technique is at least two orders of magnitude faster than the Qhull interpolation method. The speed improvement compared with the CPU implementation is about 28 times. Additionally, notice how the speed increase when the two GPU devices are used is around 2.05 times. This is because that each planes can be processed independently of the others in each of the two interpolation processes, thus dividing the computational load between the two graphic devices further reducing the time required to reconstruct a 3D image. Additionally, the SNR and spatial accuracy differences between the proposed technique compared and the Qhull approach were calculated and were tested for statistical significance using the Student's T-test. No significant differences (p<0.05) were found on the images formed from the simulations. Additionally, no significant differences (p<0.05) could be found between the SNR and spatial accuracy values of the images formed from simulated datasets using the single and dual GPU implementations of the proposed method.

Figure 5A:
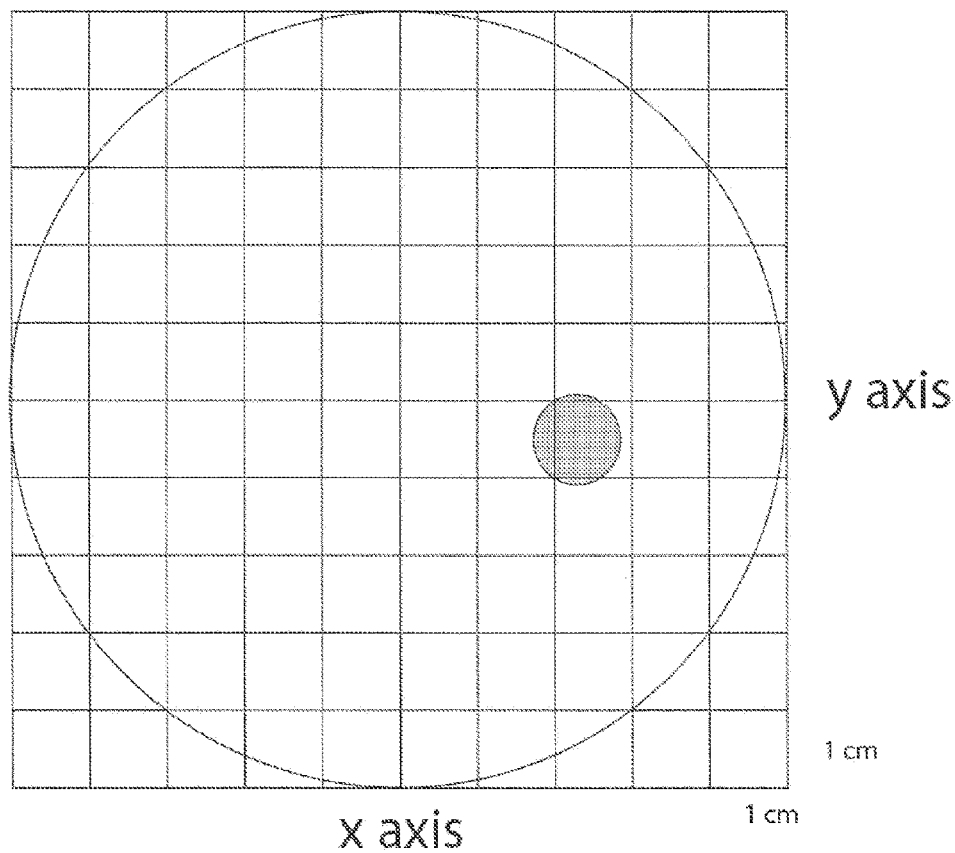
FIG. 5(*a*) is an axial view of the phantom setup in experiment 1.
Figure 5B:
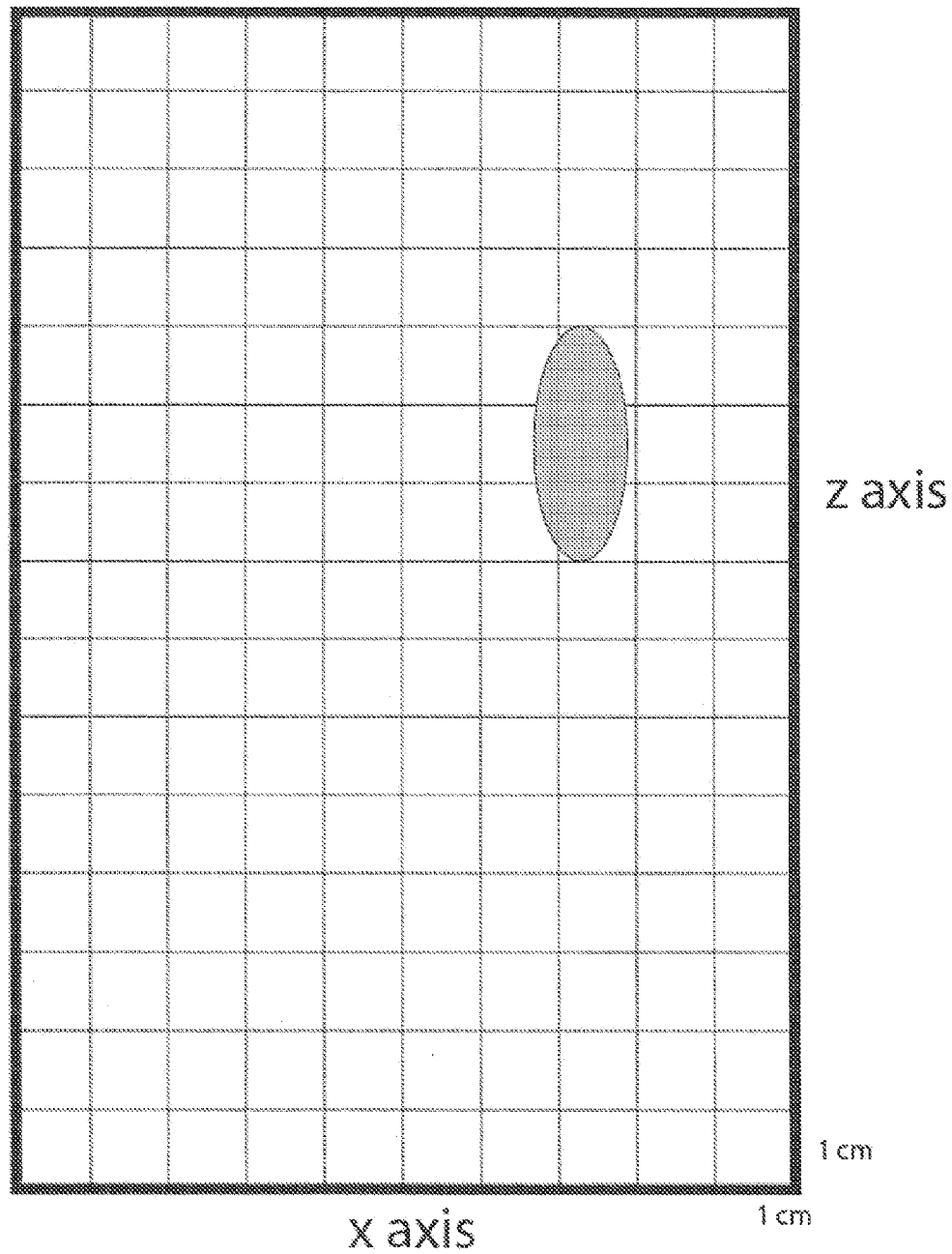
Figure 5C:
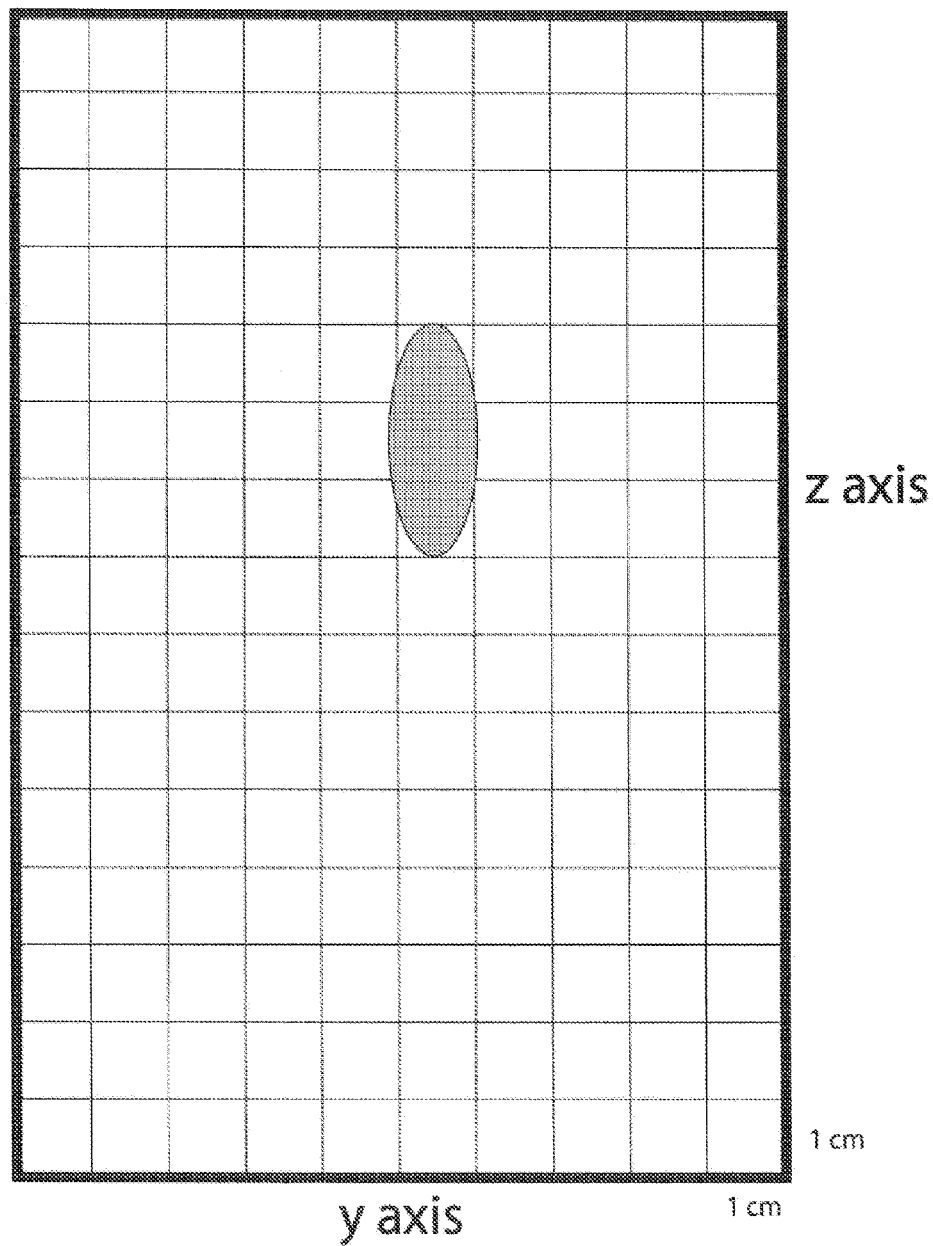
Figure 5D:
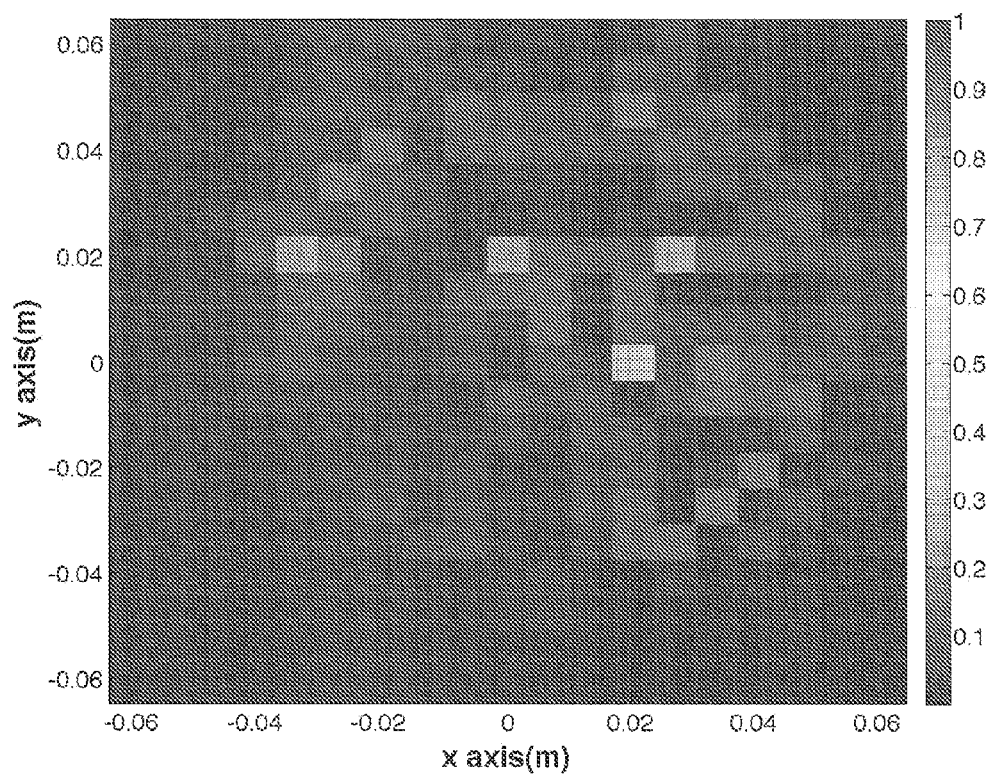
Figure 5E:
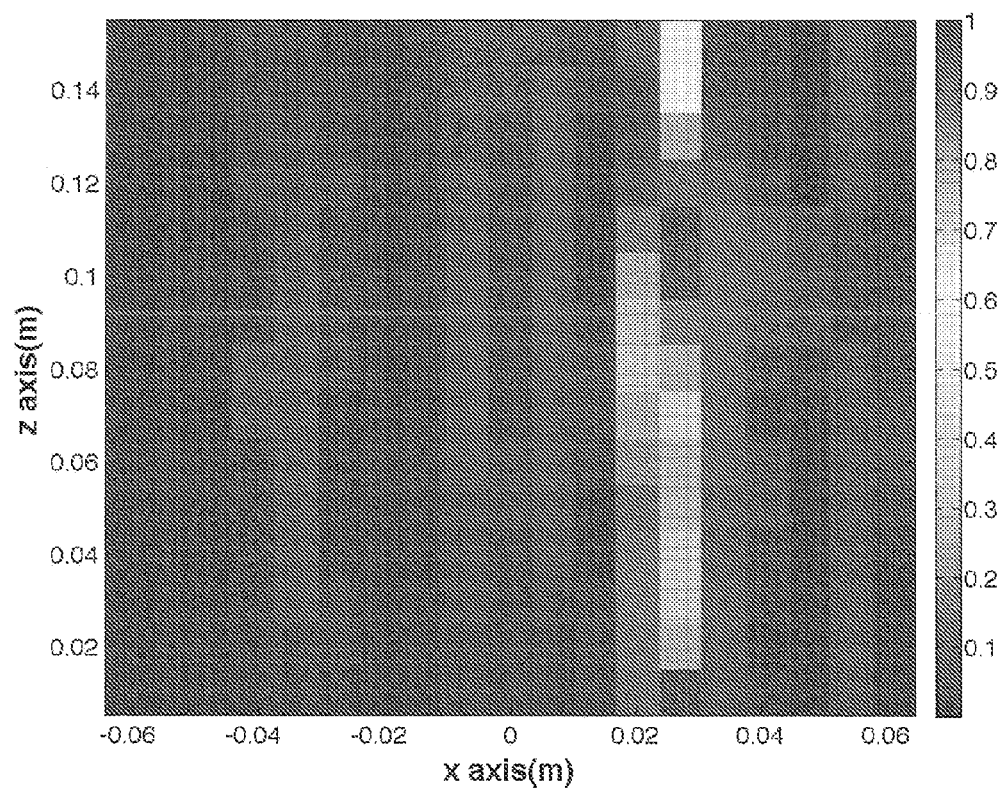
Figure 5F:
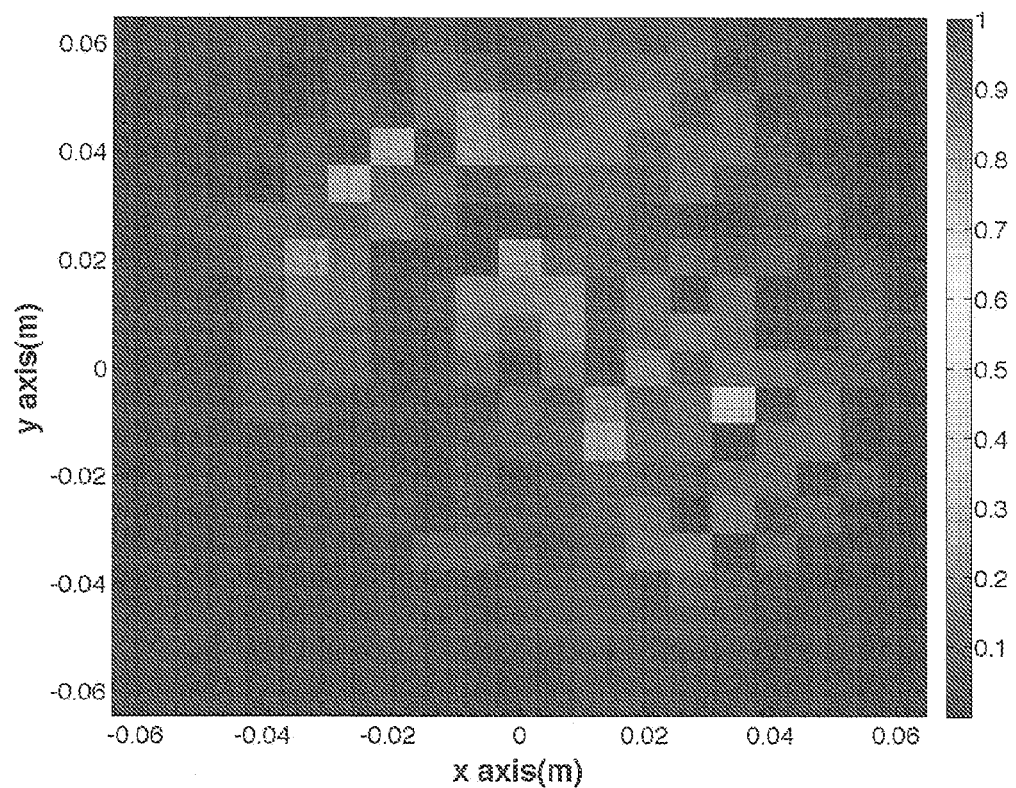
Figure 5G:
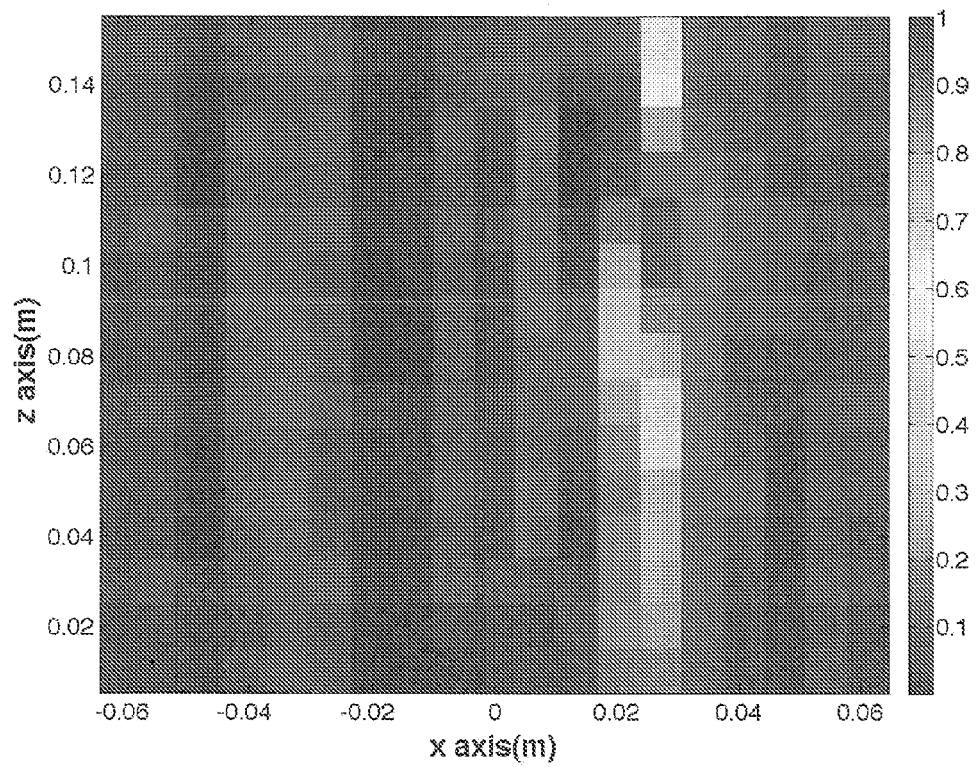
Figure 5H:
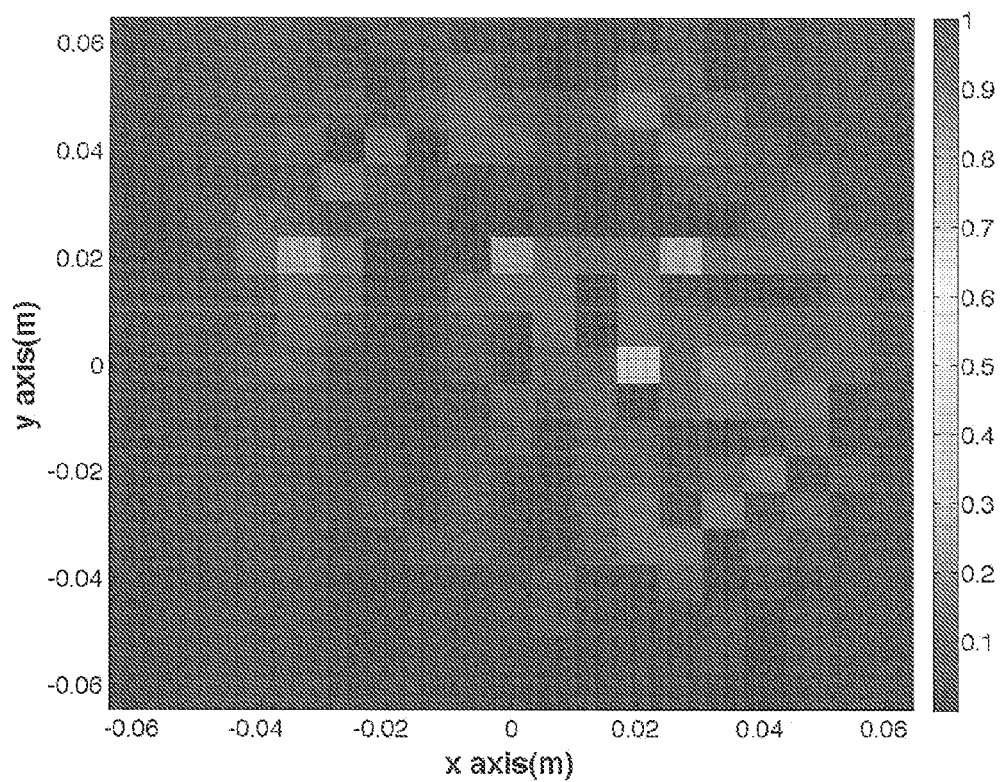
Figure 5I:
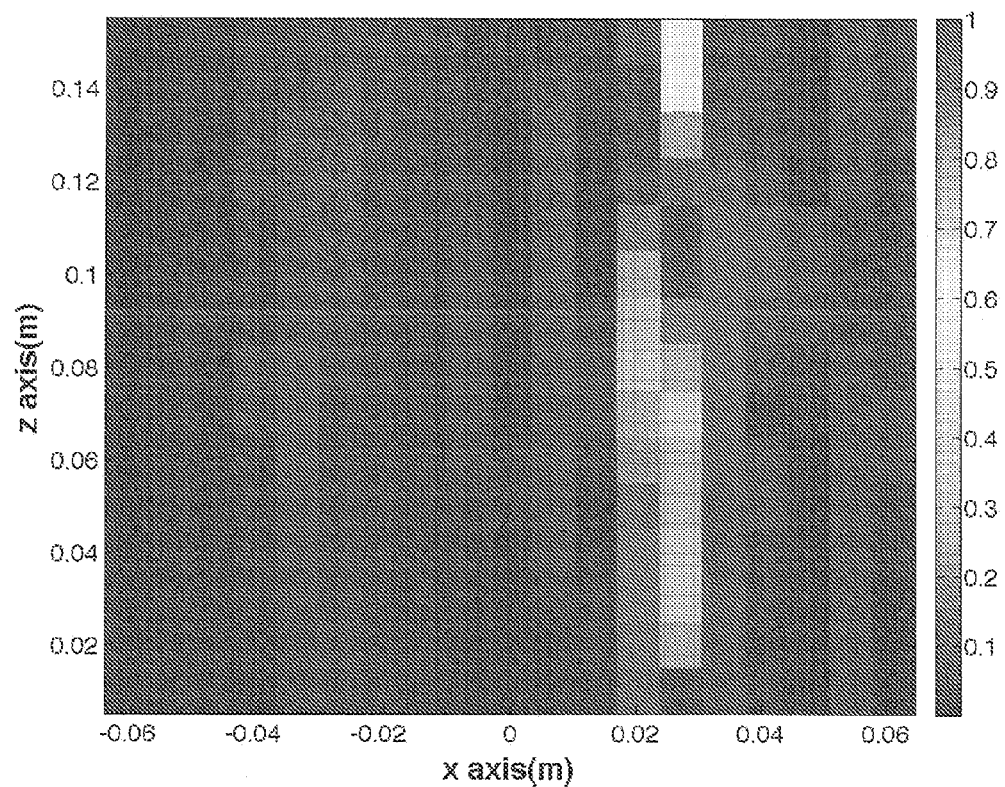
Figure 5J:
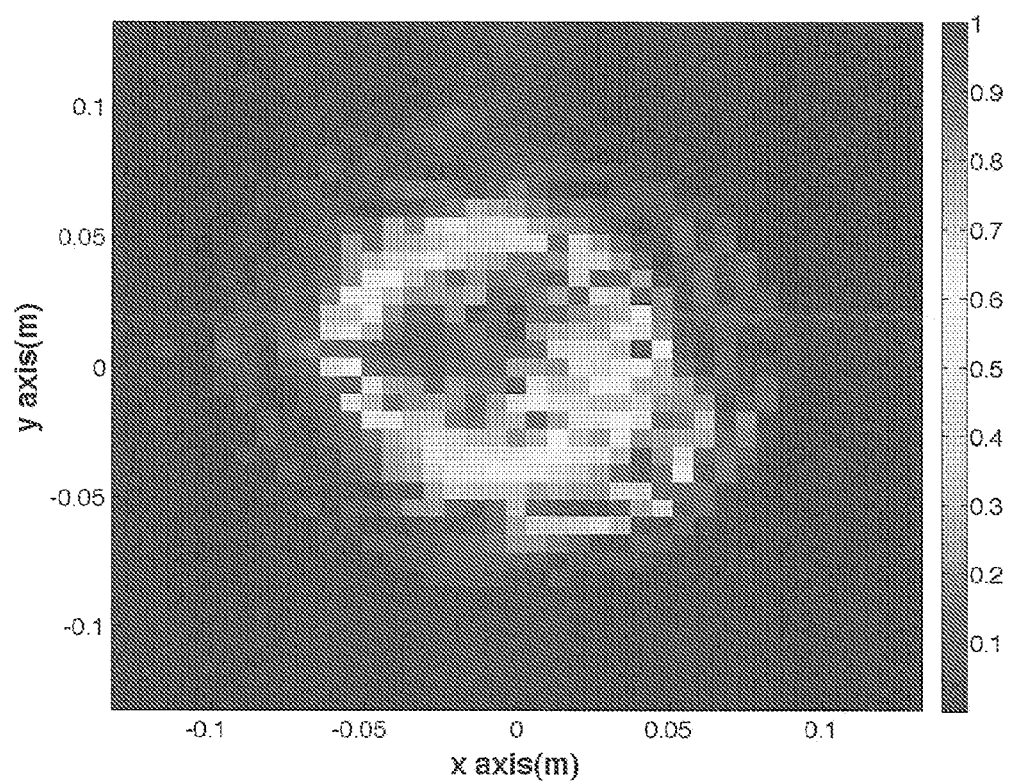
Figure 5K:
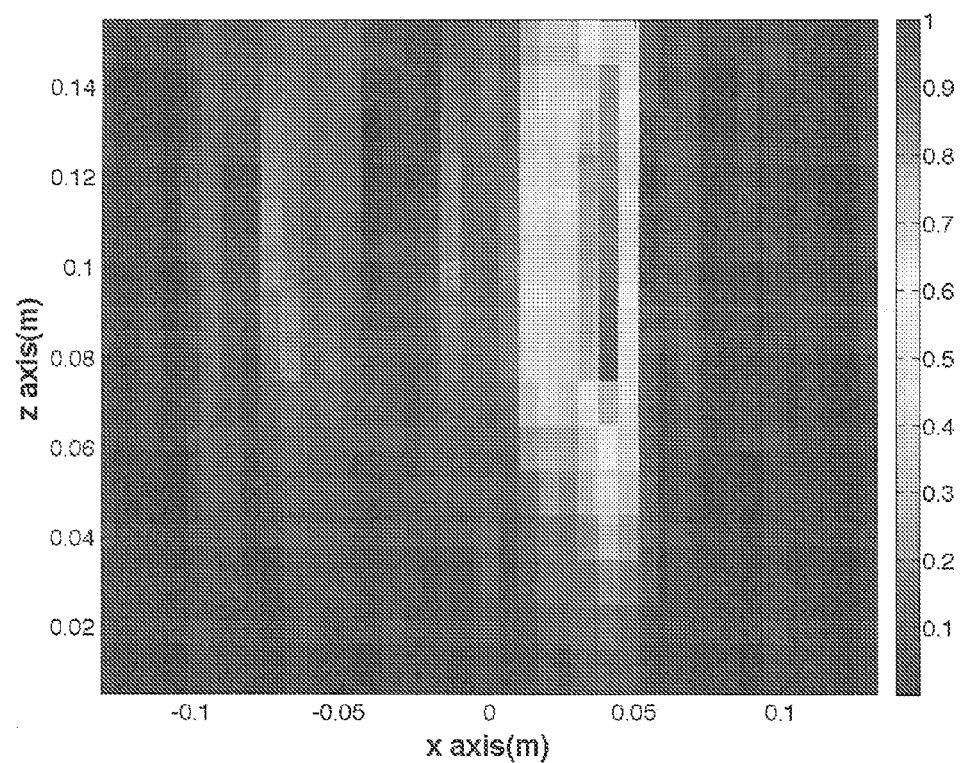

Next, the experimental feasibility of the proposed method was assessed using four experimental datasets. The setup in experiment 1 only contained one target was present and it is shown in FIG. 5(a) to (c). To make it easier to visualize the performance of the proposed method, the axial and coronal cross sections of each reconstructed target is displayed. The axial and coronal images of the target signature generated by the proposed method are shown in 5(d)-(e). The results yielded by the Qhull approach can be seen in FIG. 5(f)-(g). The axial and coronal cross-sections obtained using the CPU version of the proposed method is illustrated in FIG. 5(h)-(i). Finally, the axial and coronal images generated using the confocal mapping approach are shown in FIG. 5(j)-(k). The SNR of the image formed using the proposed approach in this experiment was 8.81 dB, which is slightly larger than the values obtained for the images formed using the Qhull, CPU-LUT and confocal mapping approaches (8.77, 8.8 and 2.94 dB respectively).

Figure 6A:
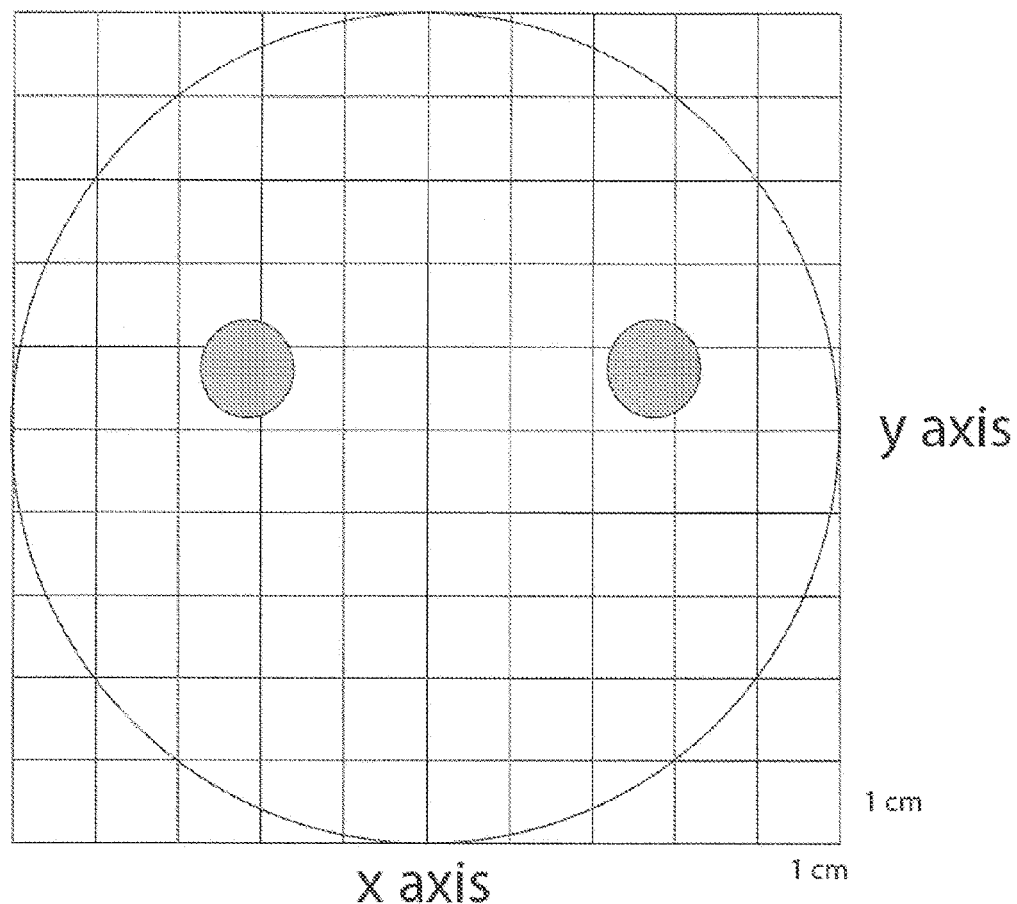
FIG. 6(*a*) is an axial view of the phantom setup in experiment 2.
Figure 6B:
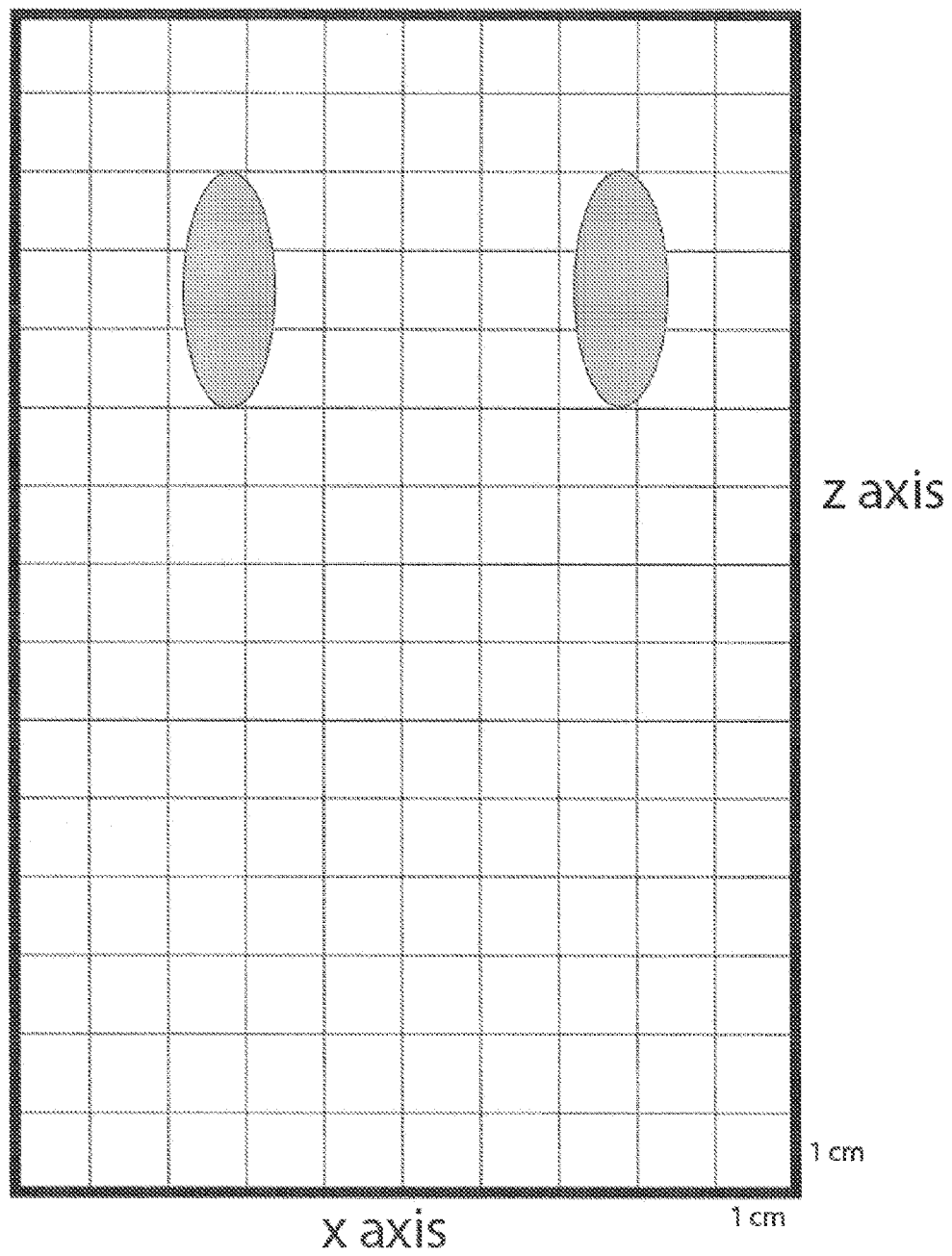
Figure 6C:
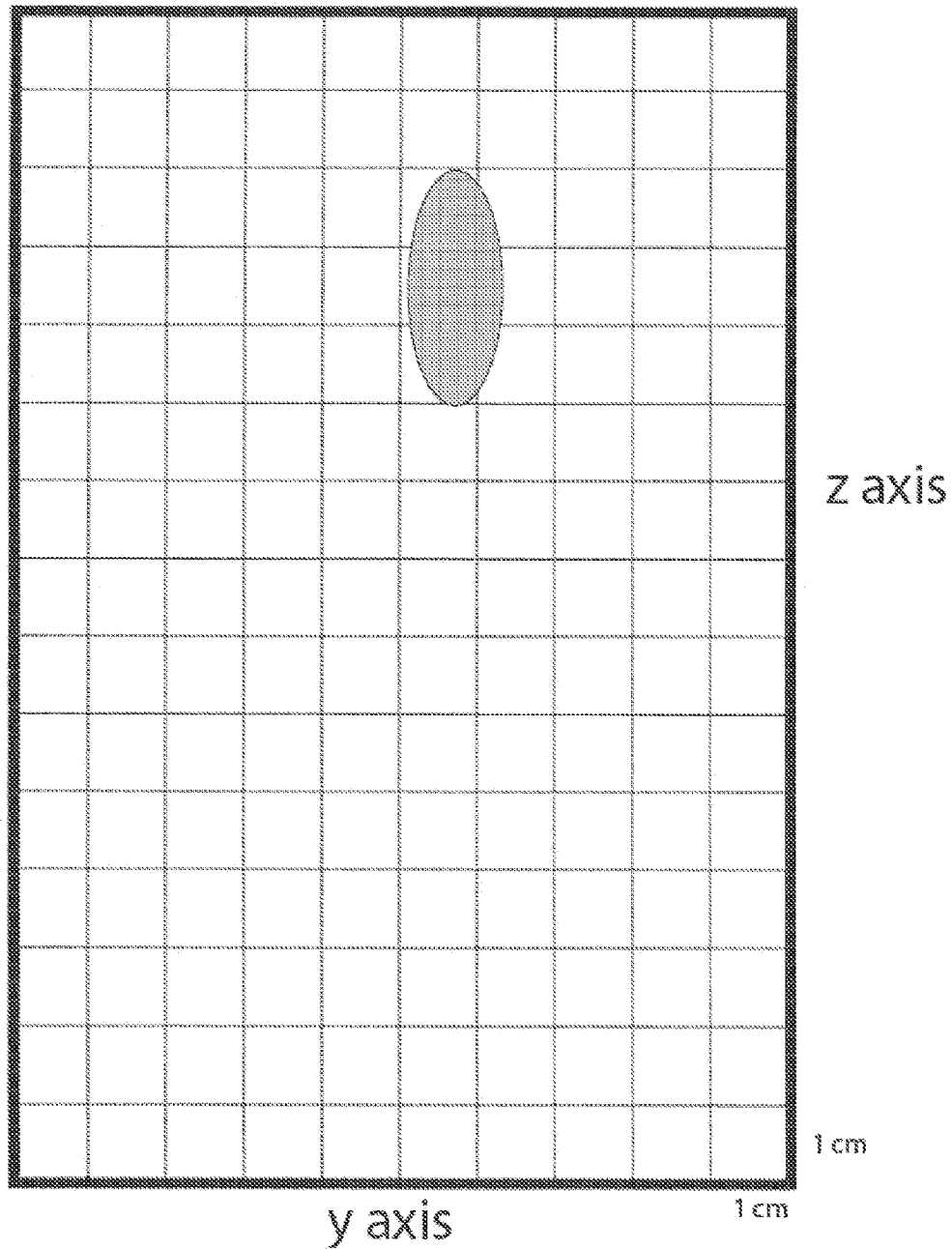
Figure 6D:
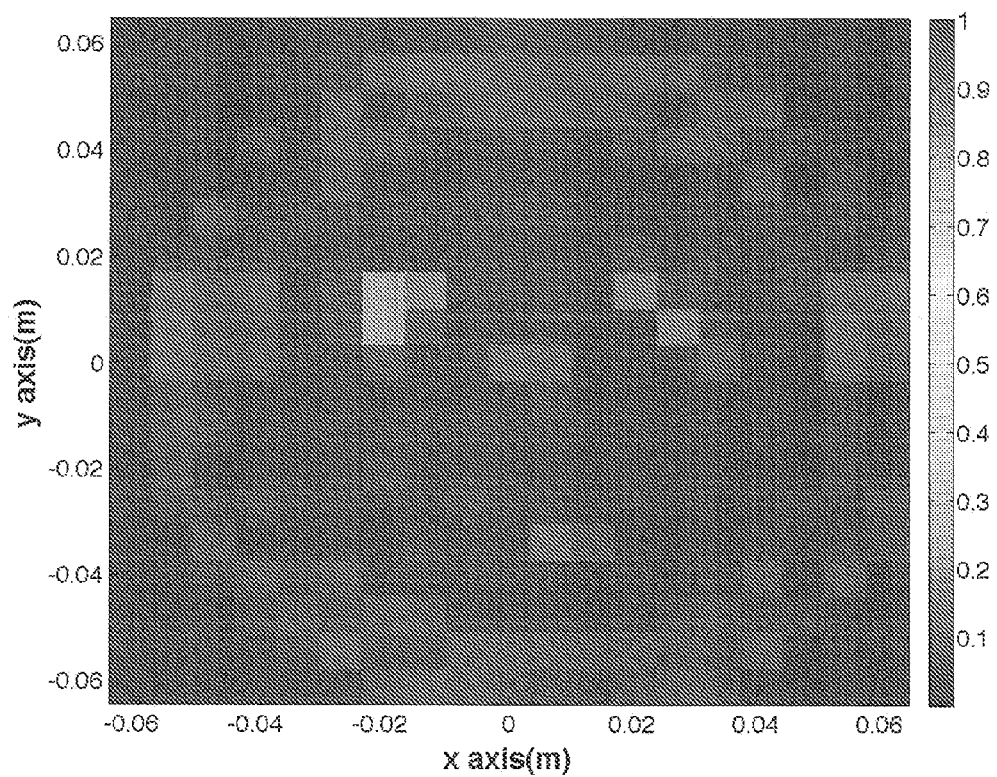
Figure 6E:
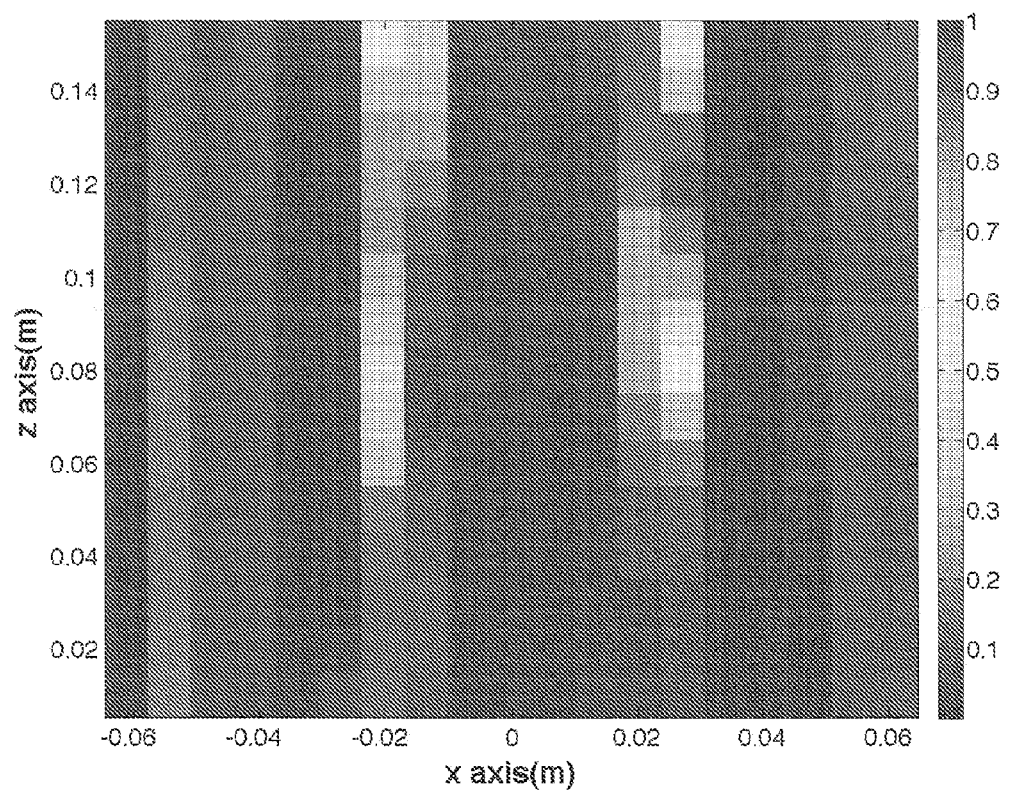
Figure 6F:
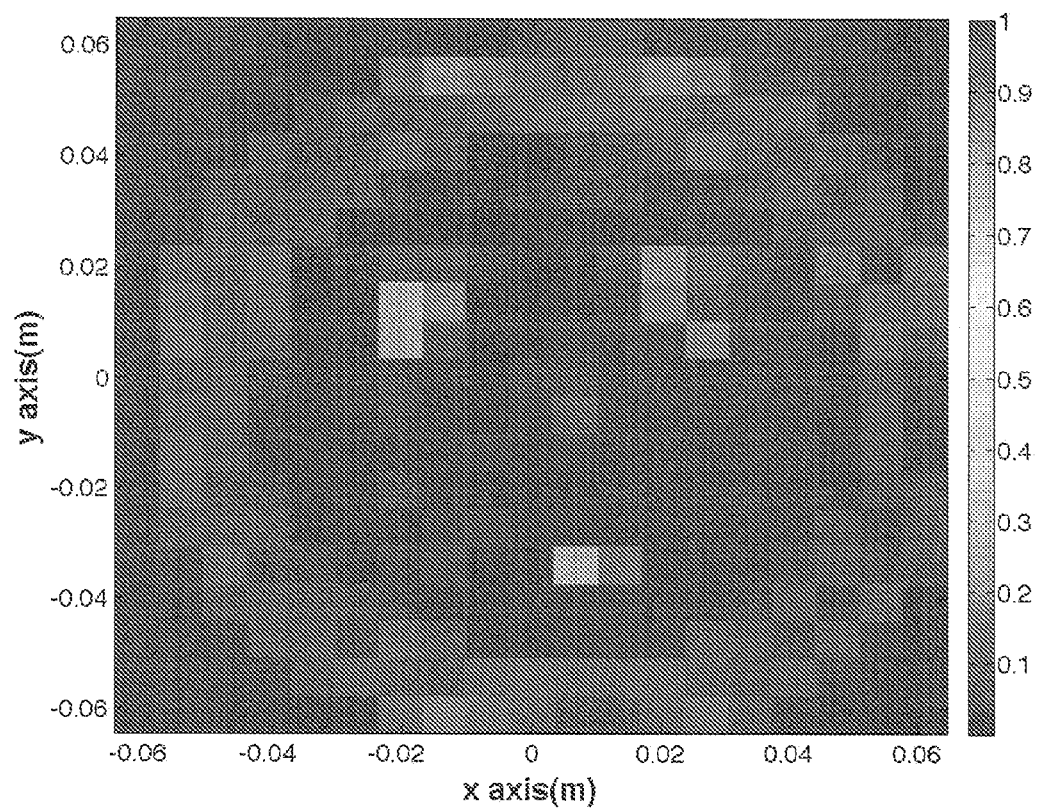
Figure 6G:
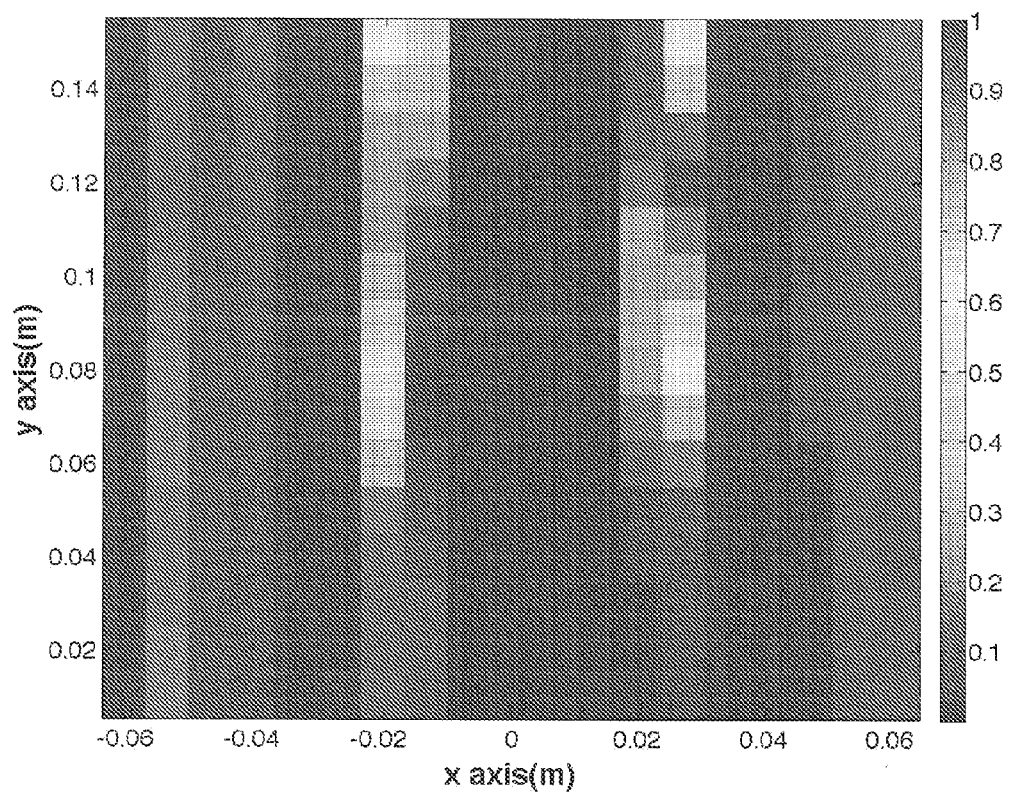
Figure 6H:
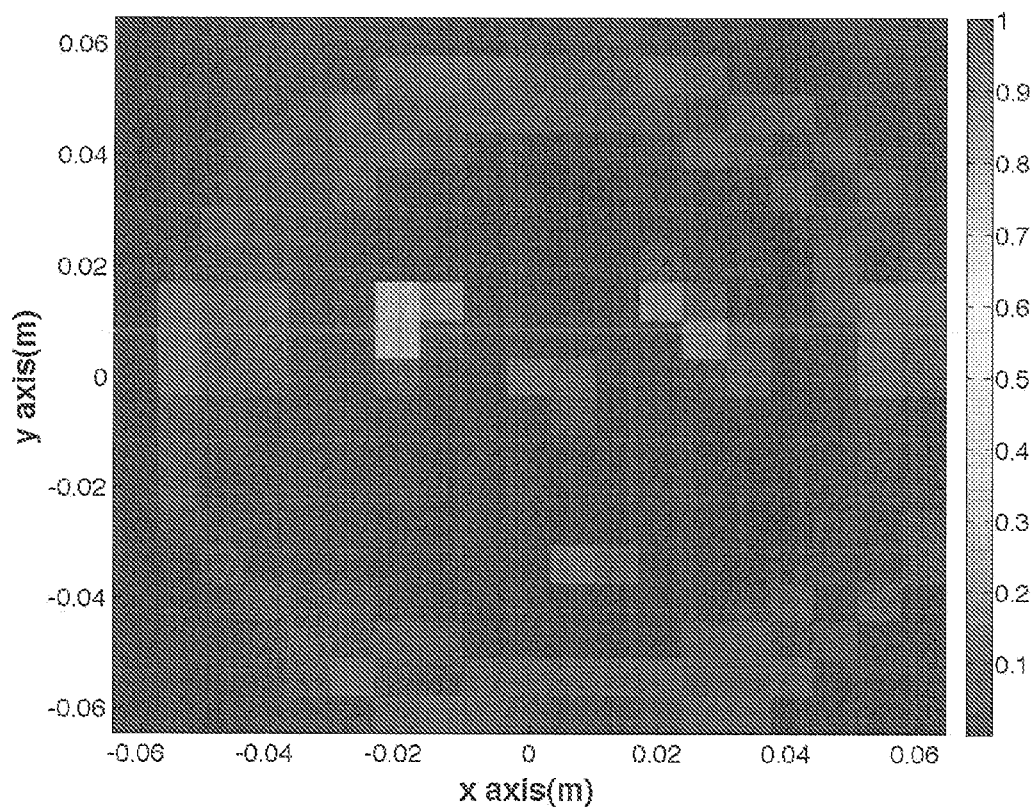
Figure 6I:
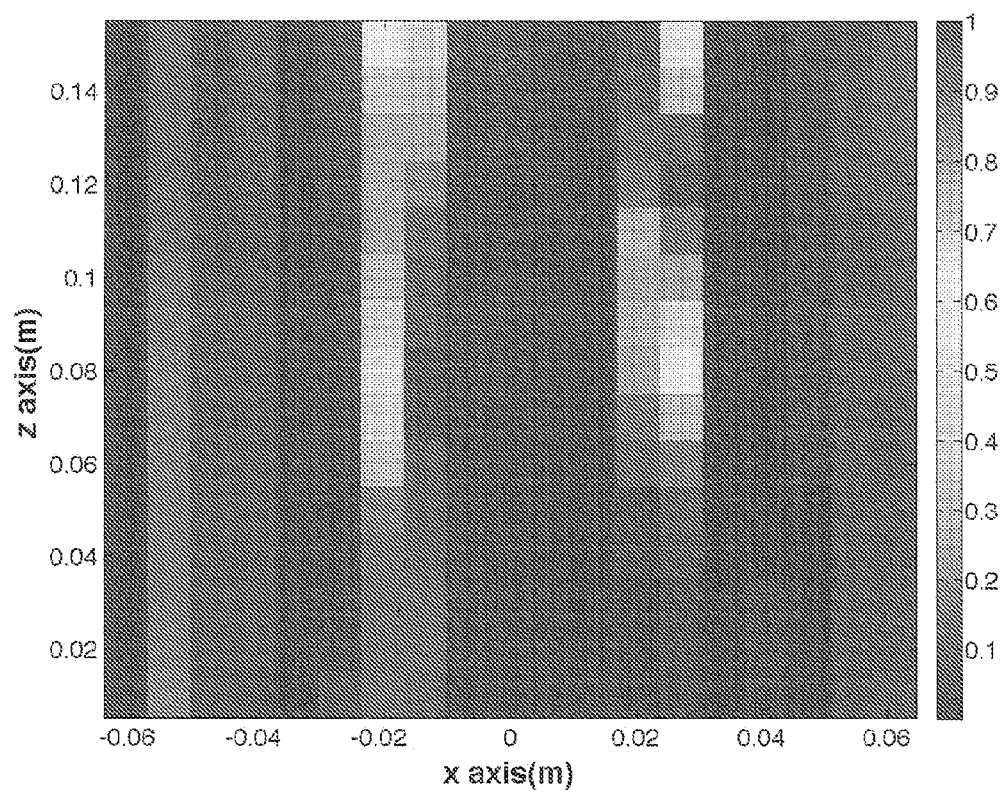
Figure 6J:
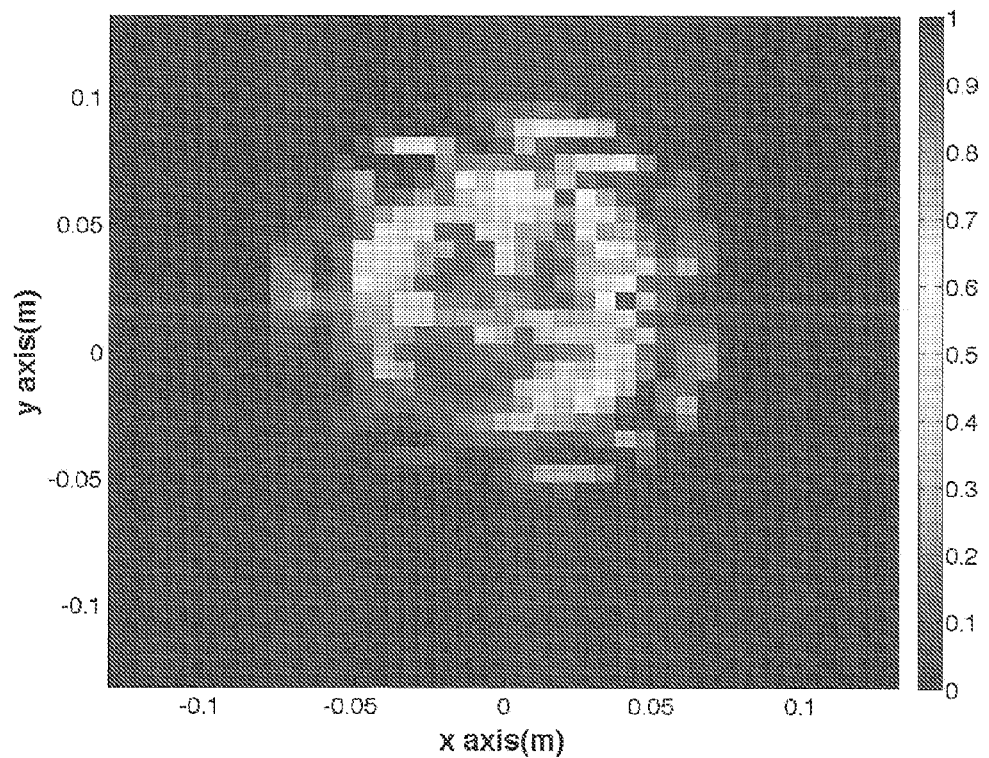
Figure 6K:
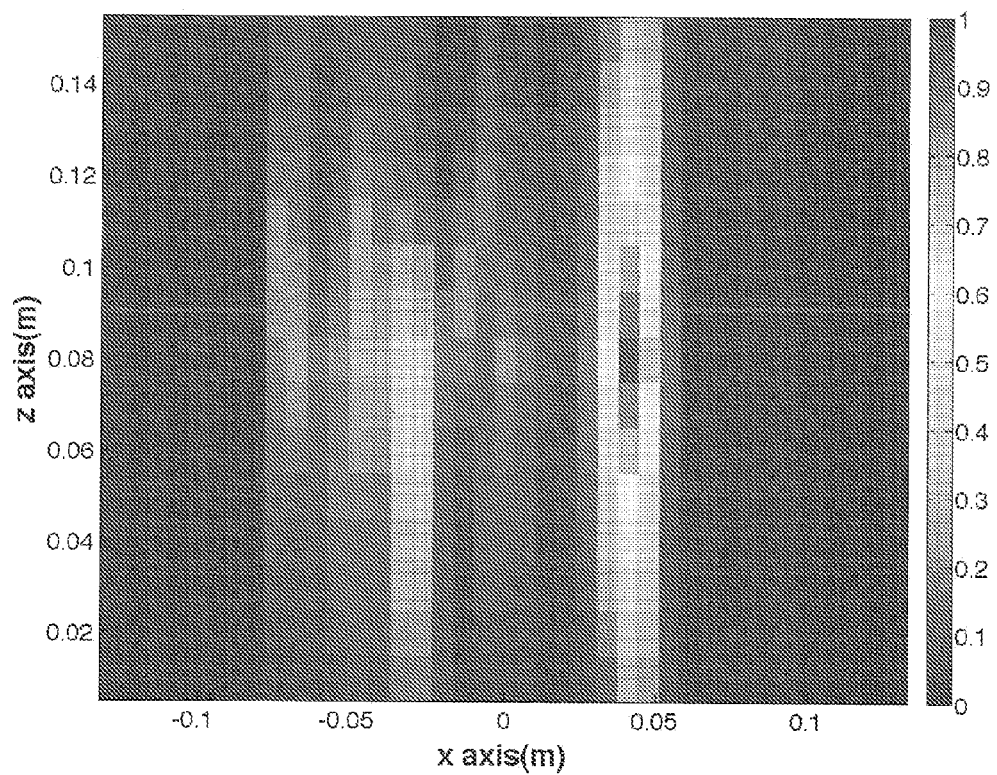
Figure 6I:
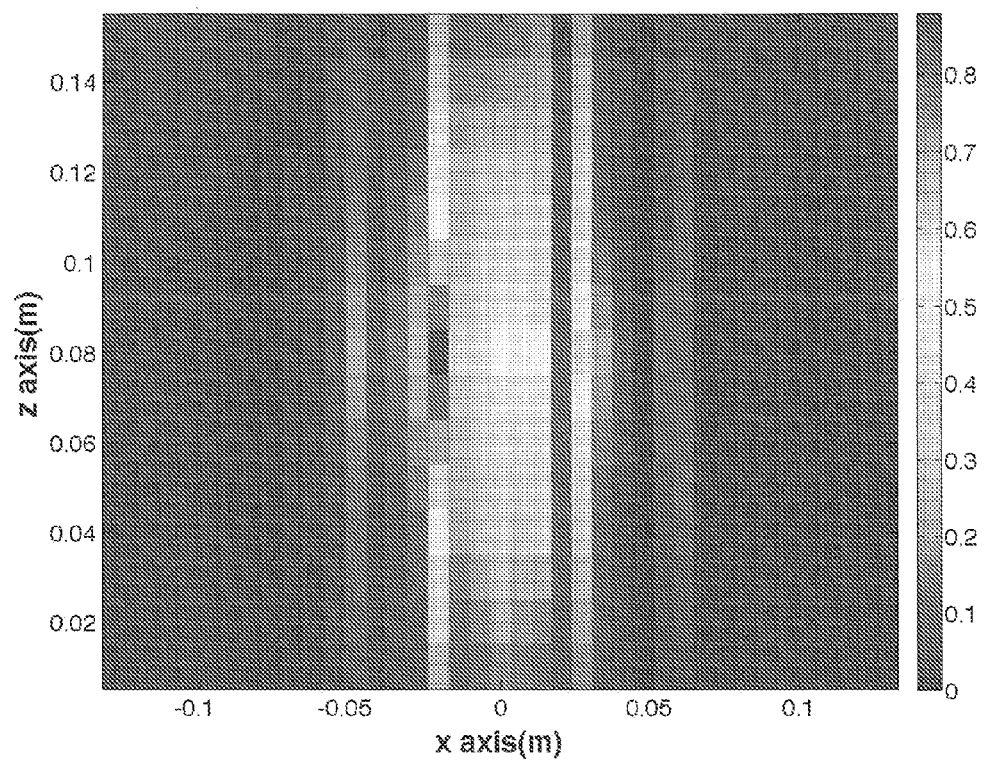

The setup used in experiment 2 is shown in FIG. 6(a)-(c). The axial and coronal images generated by the proposed approach are shown in FIG. 6(d) and (e). The resulting cross sections of the target responses formed by the Qhull approach and CPU-LUT approaches are shown in FIG. 6(f)-(g) and FIG. 6(h)-(i) respectively. Finally, the axial and coronal views of target responses obtained from processing the dataset using the confocal mapping algorithm are shown in FIG. 6(j)-(l). Notice how there in all the reconstructed images the locations of the reconstructed target signatures are consistent with their locations on the experimental setup. The image reconstructed using the proposed method had a SNR of 8.5 dB. The SNR of the images produced using the Qhull and the CPU-LUT approach were 8.48 dB for both. The SNR for the 3D image generated using the confocal mapping algorithm was 3.36 dB.

Figure 7A:
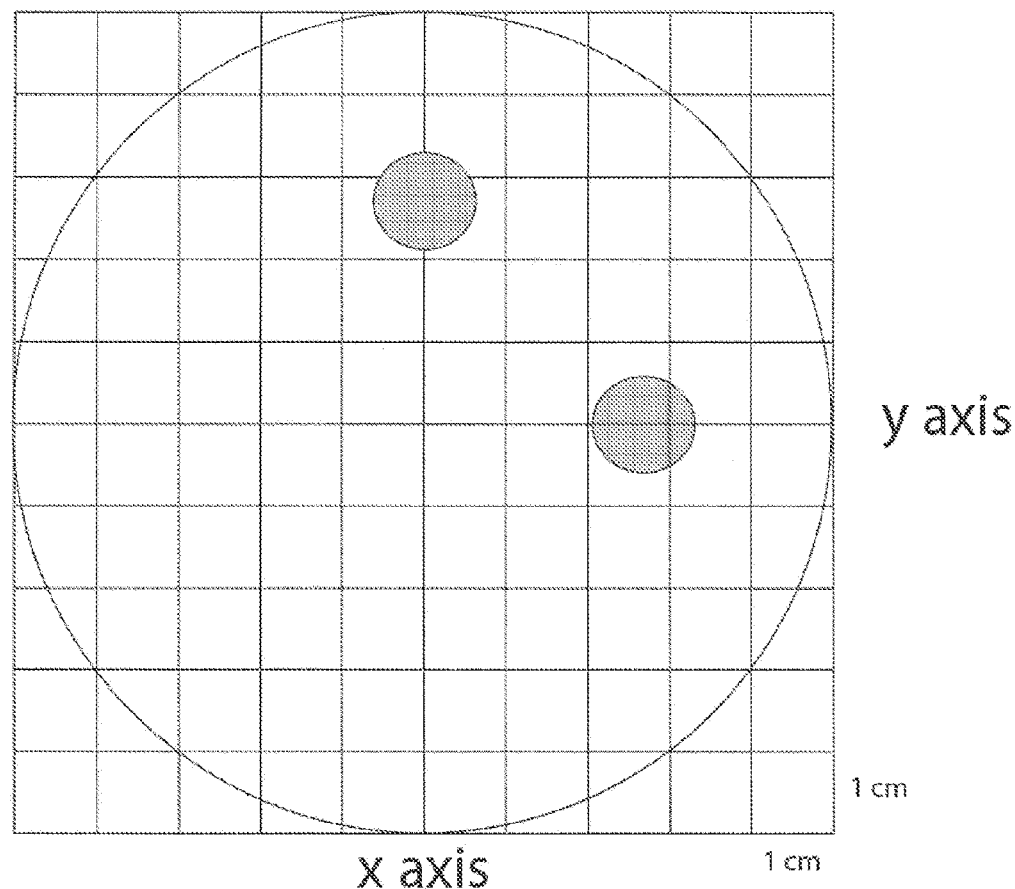
FIG. 7(*a*) is an axial view of the phantom setup in experiment 3.
Figure 7B:
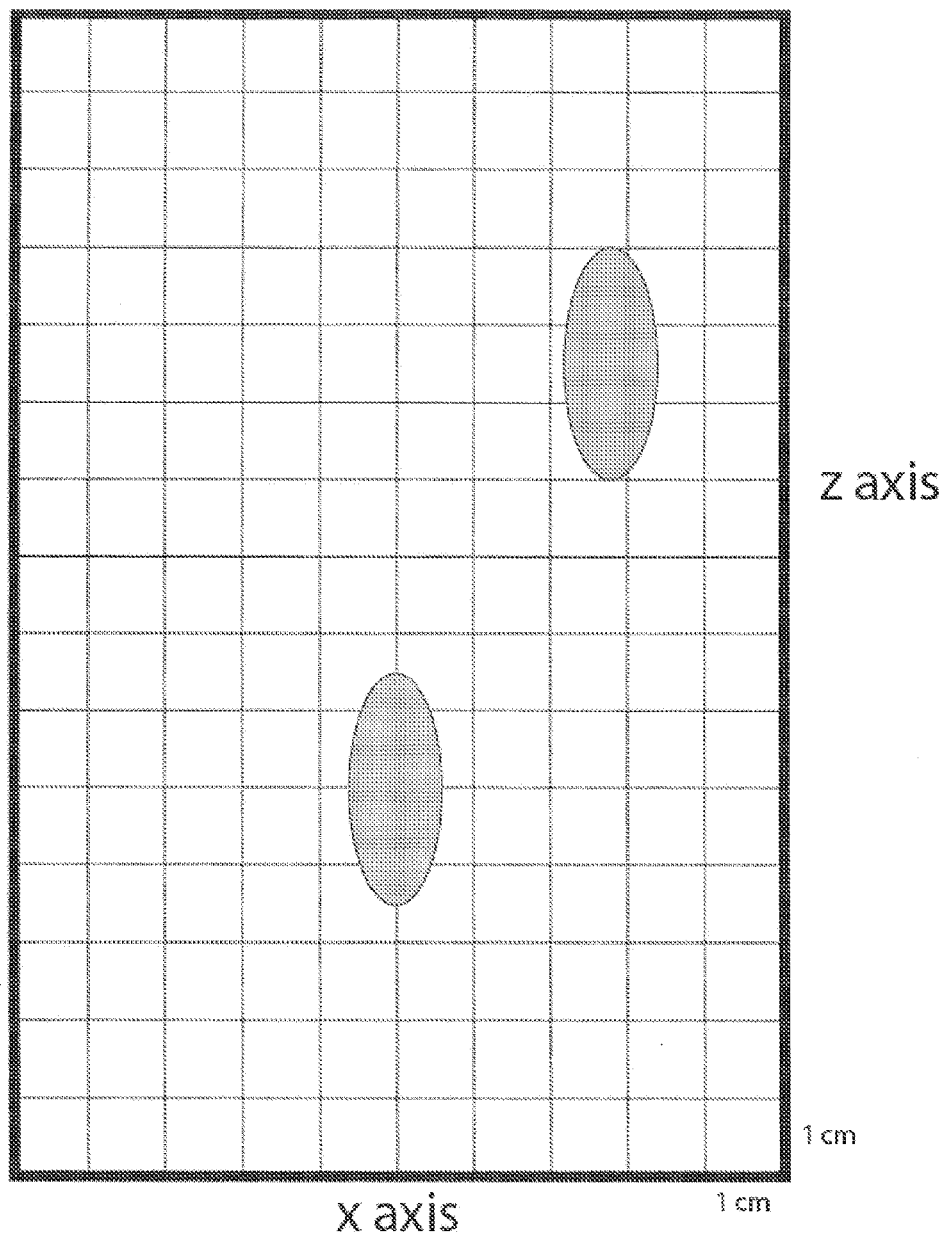
Figure 7C:
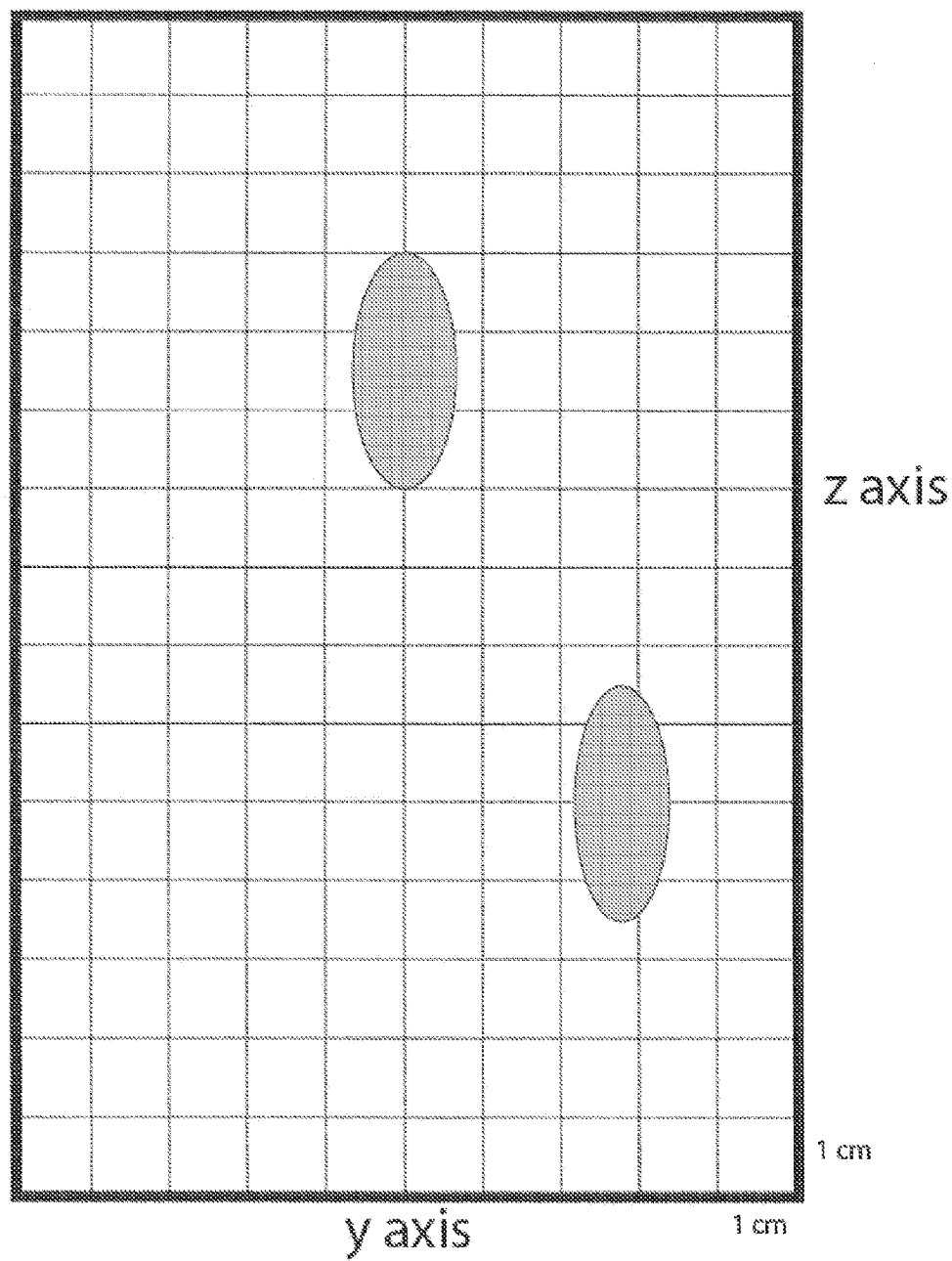
Figure 7D:
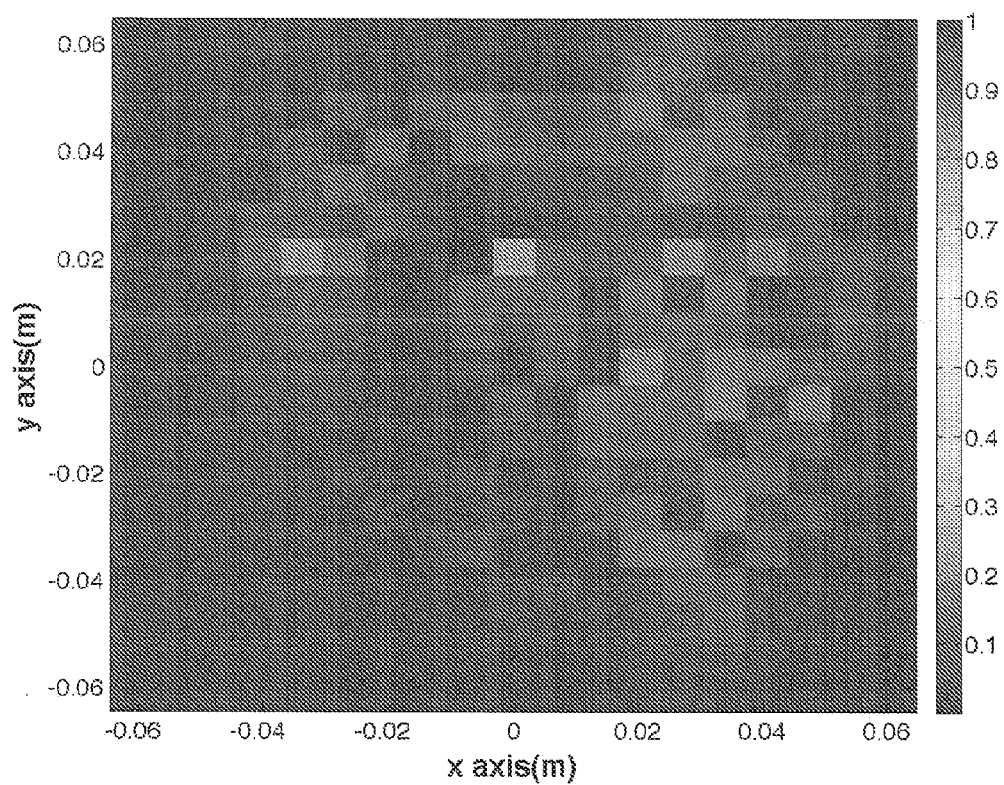
Figure 7E:
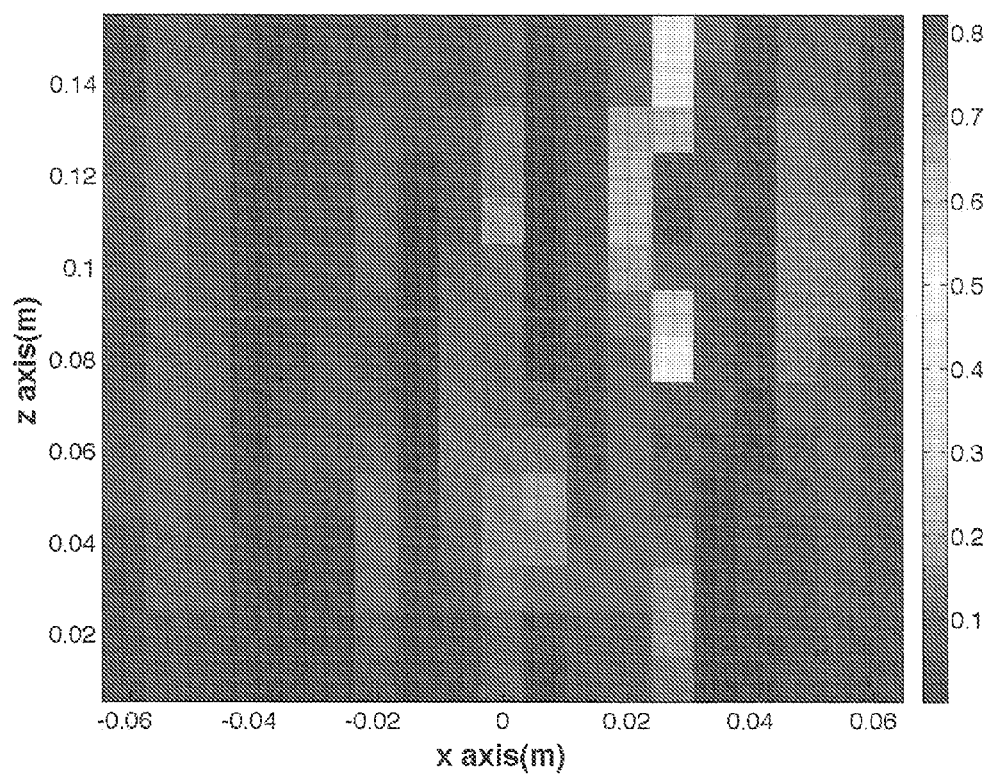
Figure 7F:
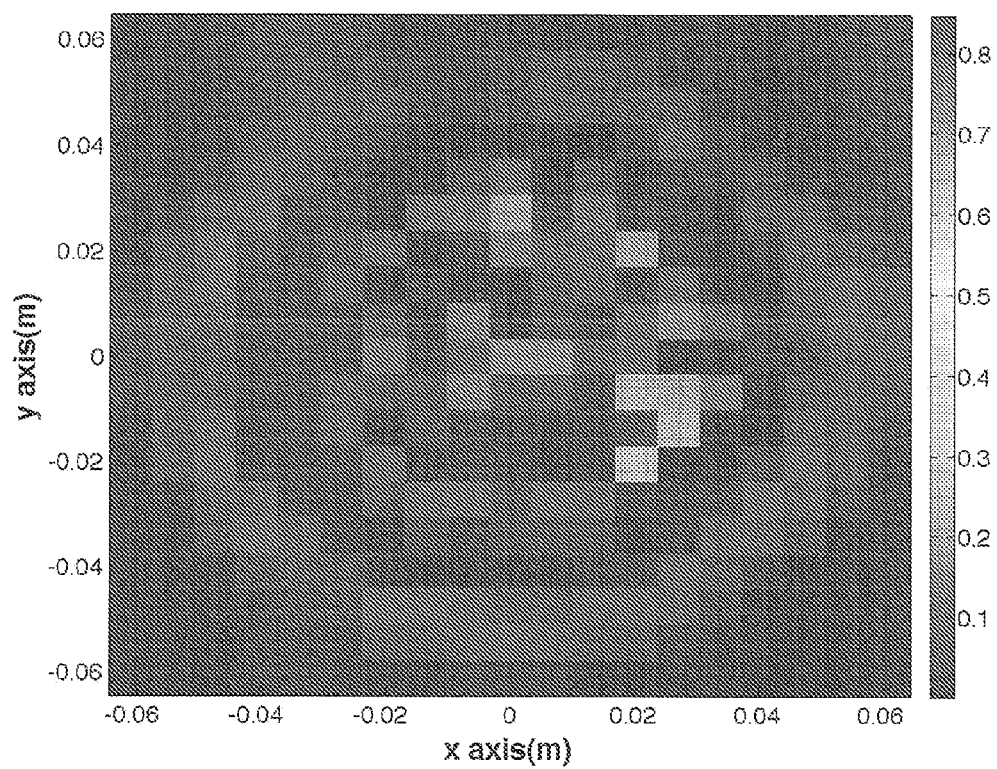
Figure 7G:
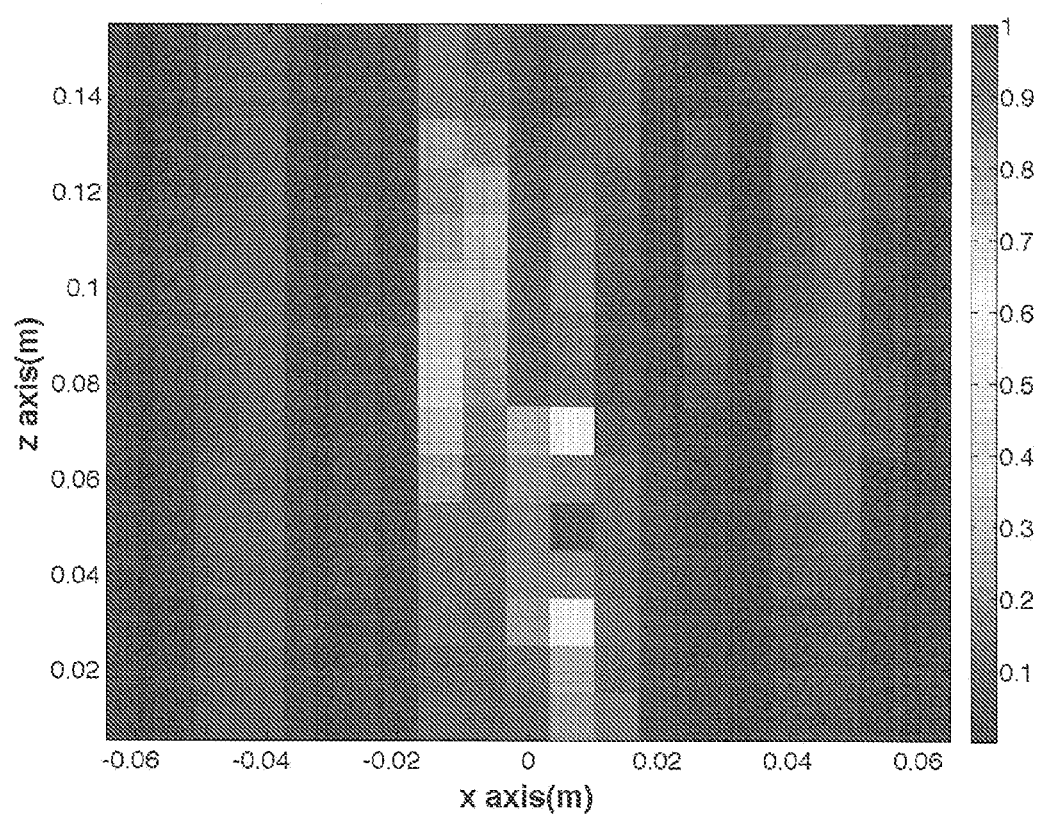
Figure 7H:
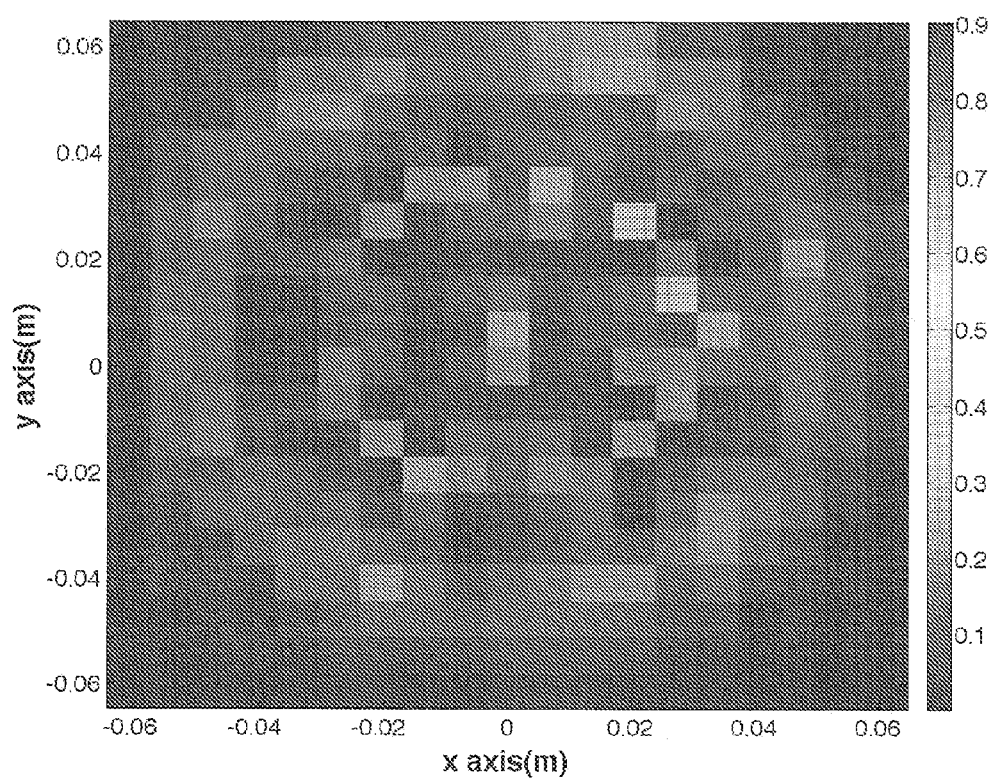
Figure 7I:
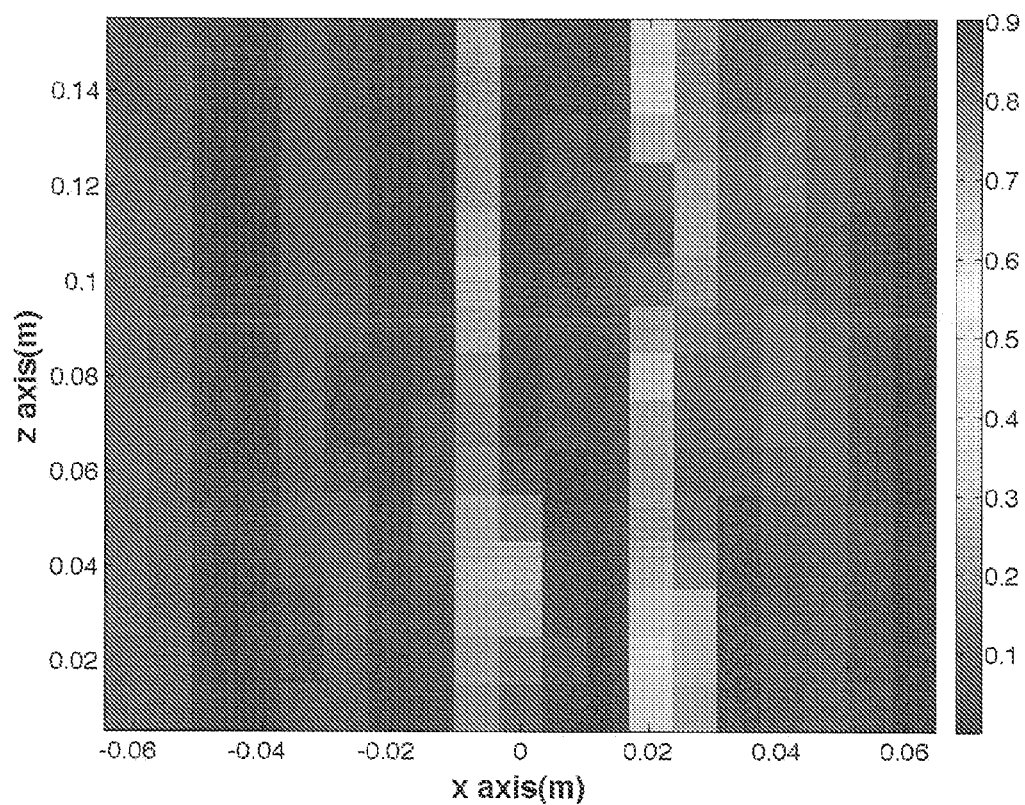
Figure 7J:
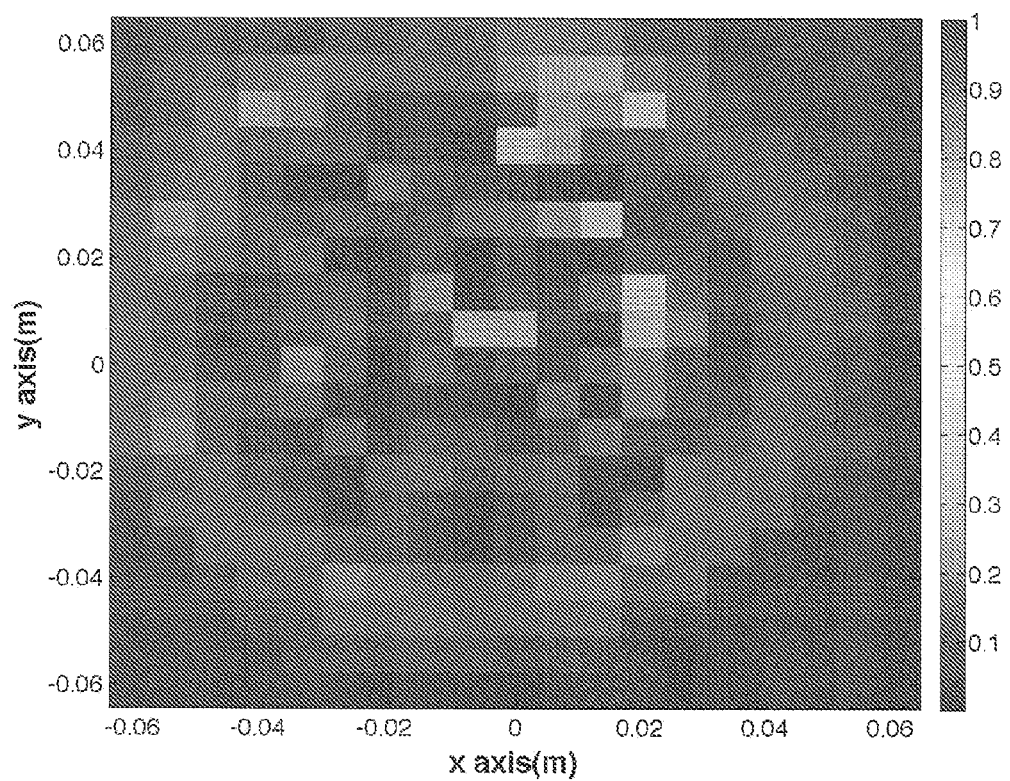
Figure 7K:
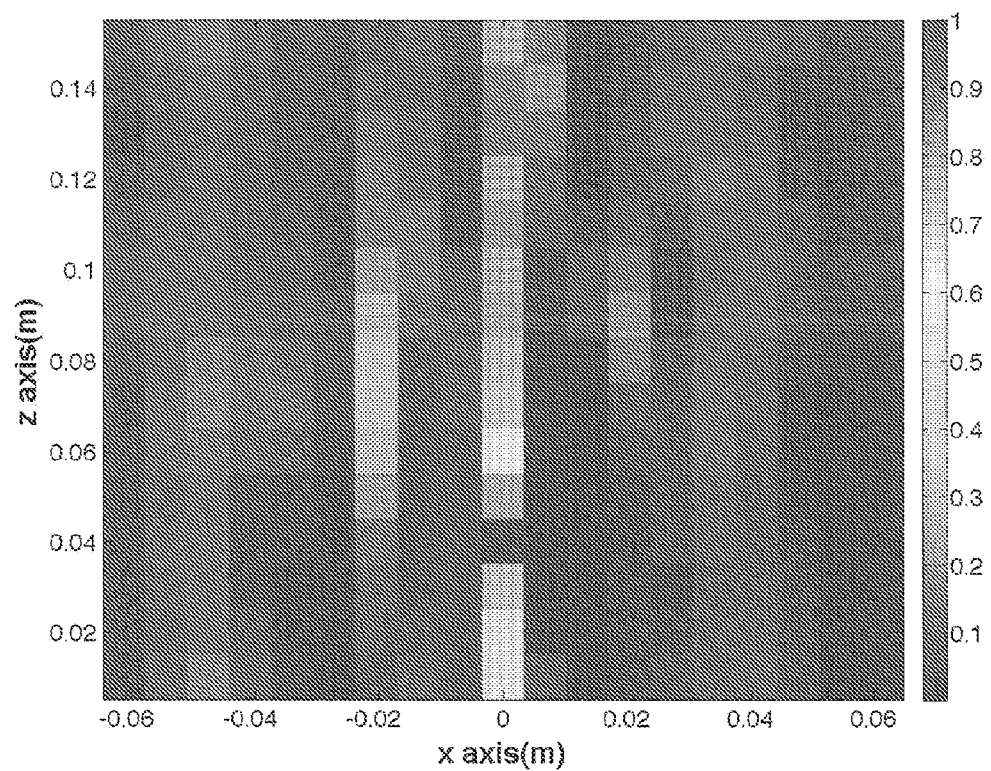
Figure 71:
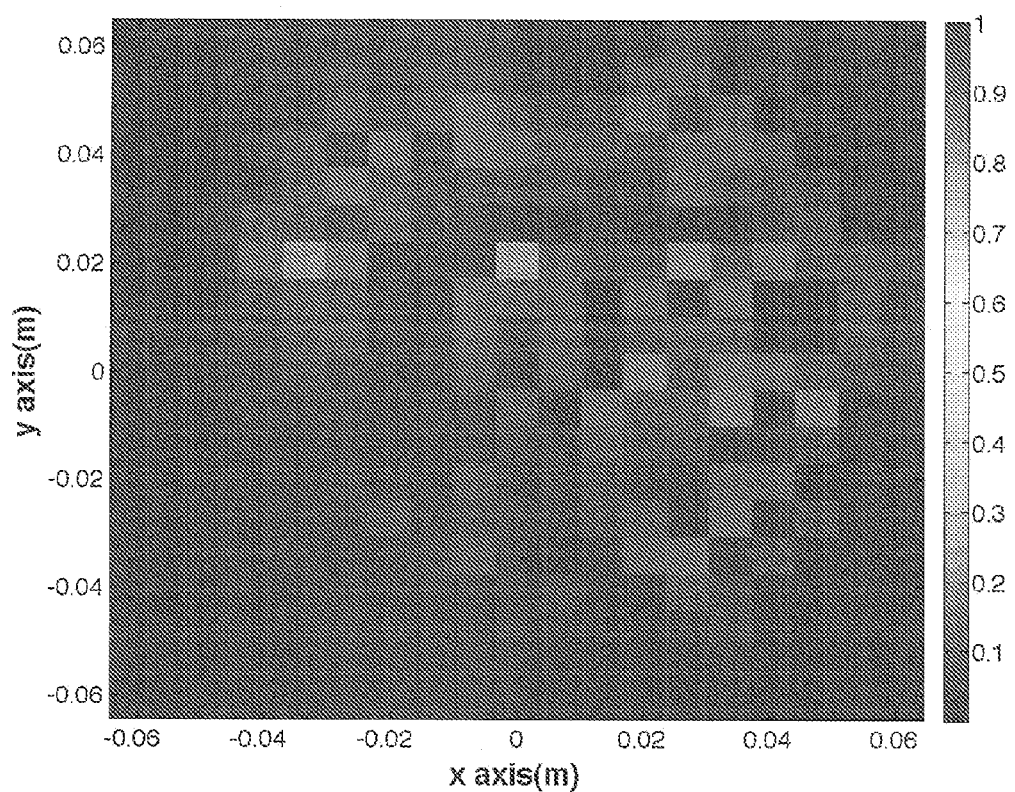
Figure 7M:
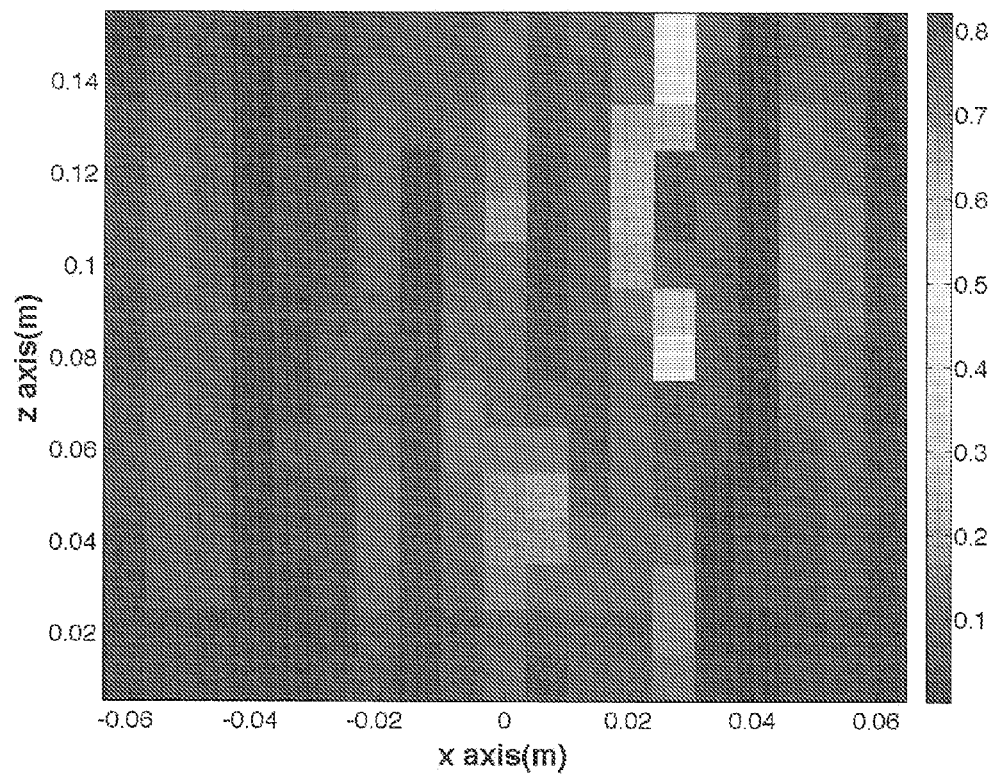
Figure 7N:
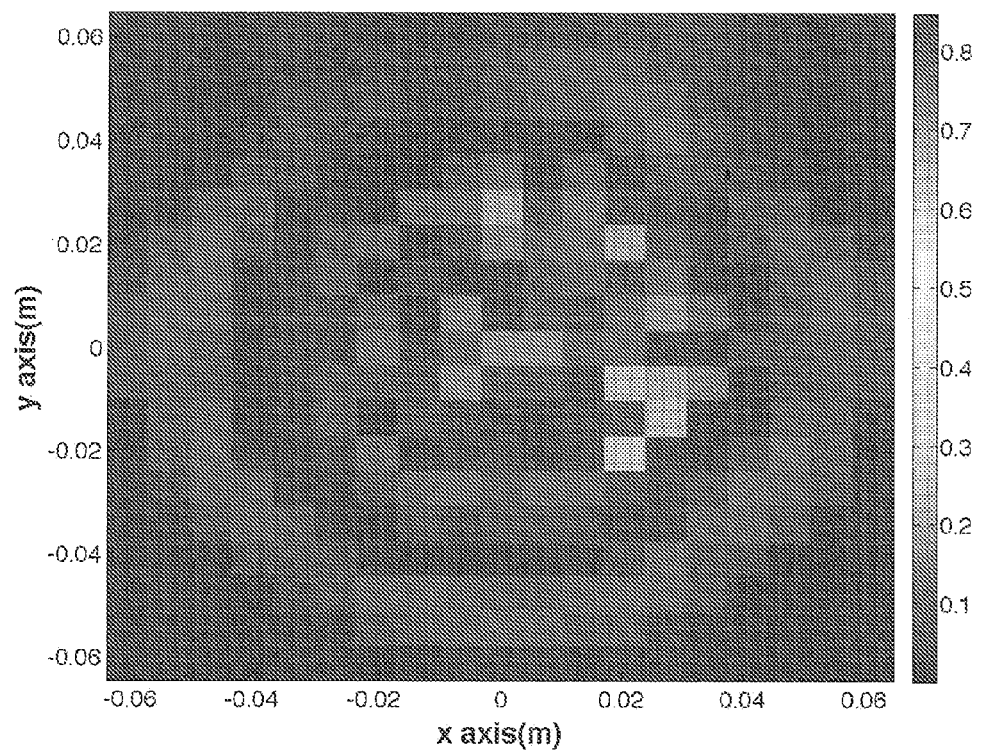
Figure 7O:
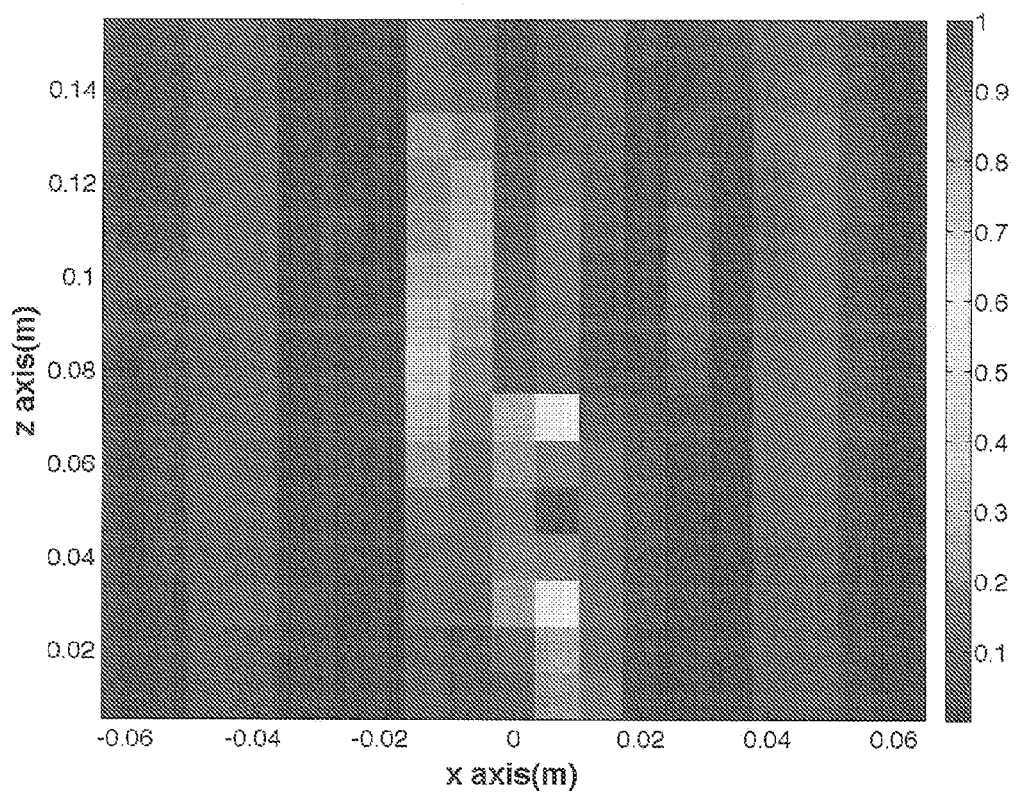
Figure 7P:
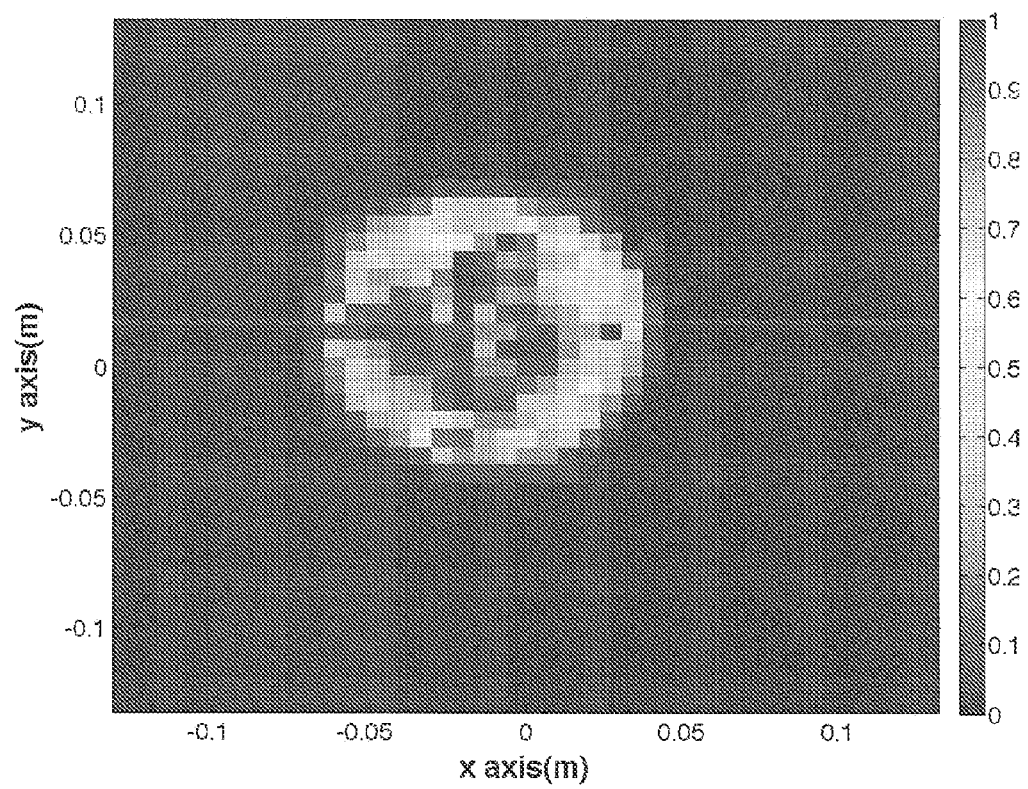
Figure 7Q:
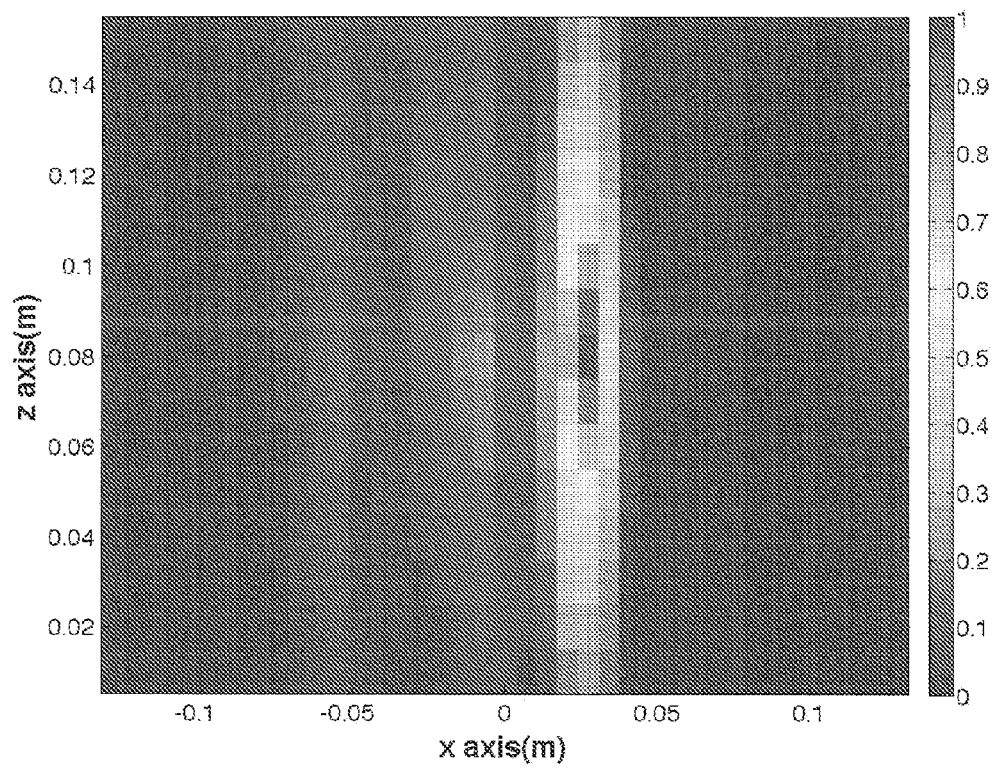
Figure 7R:
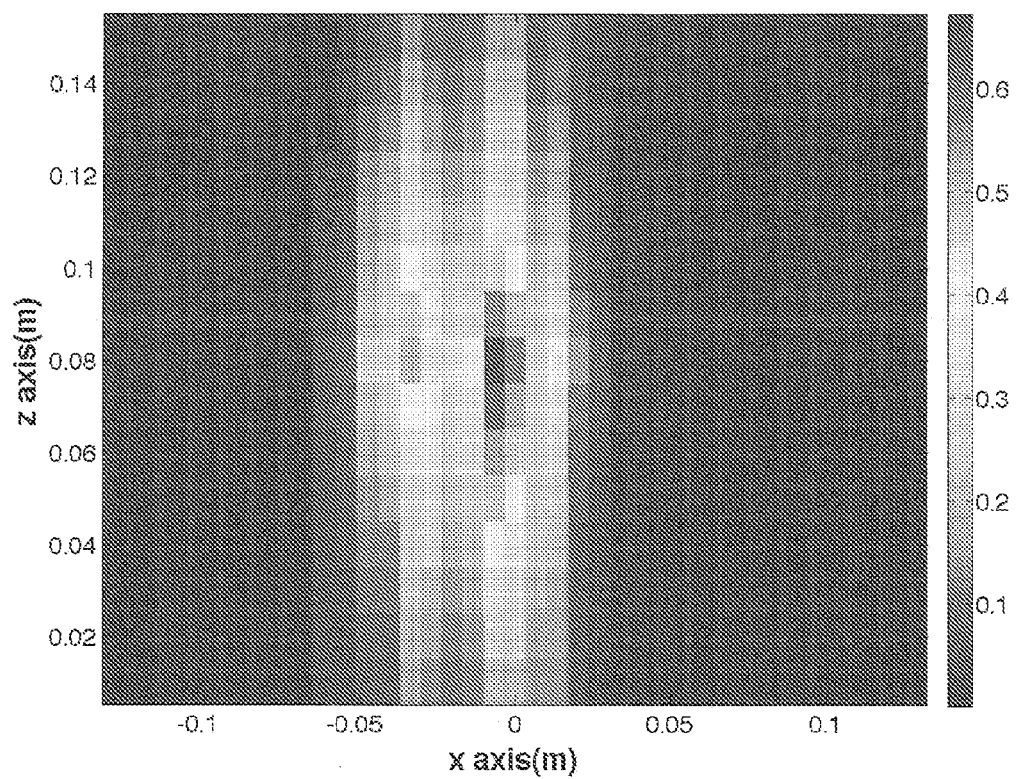

The setup used in experiment 3 is displayed in FIG. 7(a)-(c). The results of the proposed approach and are shown in FIG. 7(d)-(g). The SNR of the image yielded by the proposed method was 6.72 dB. The axial and coronal target images produced by the Qhull approach are shown in FIG. 7(h)-(k). The results of the CPU-LUT and confocal mapping approaches are are shown in FIG. 7(l)-(o) and FIG. 7(p)-(r) respectively. The SNR of the 3D models generated by the Qhull, CPU-LUT, and confocal mapping methods were 6.45, 6.7, 2.93 dB dB respectively.

Figure 8A:
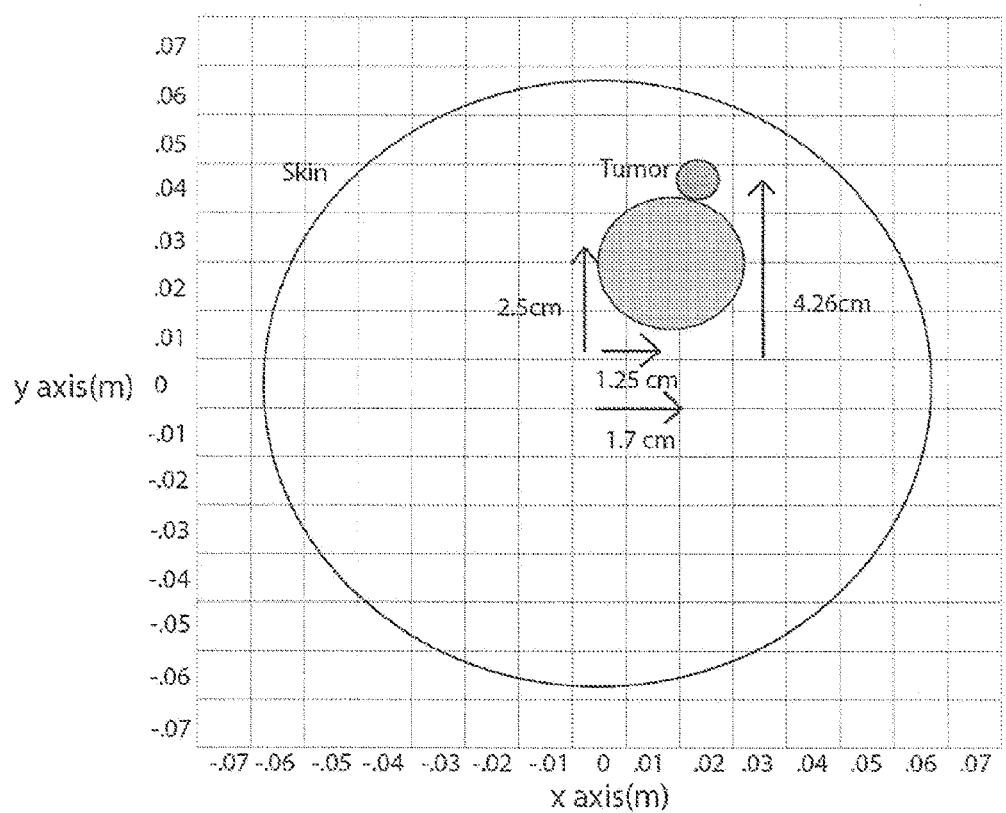
FIG. 8(*a*) is an axial view of the phantom setup in experiment 4.
Figure 8B:
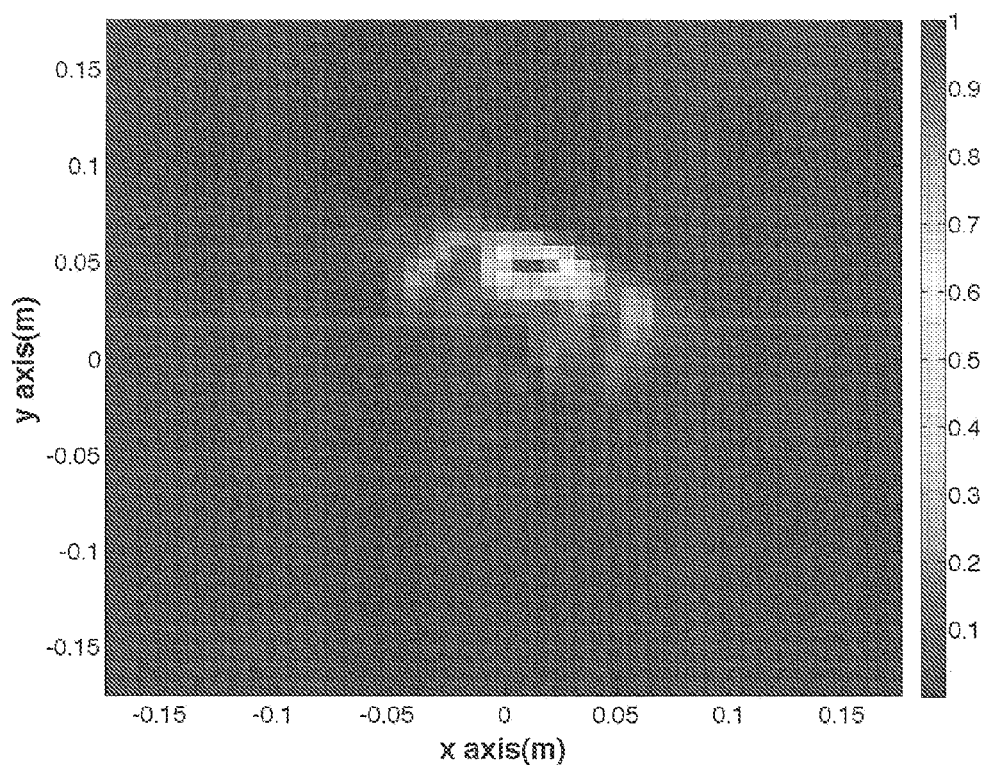
Figure 8C:
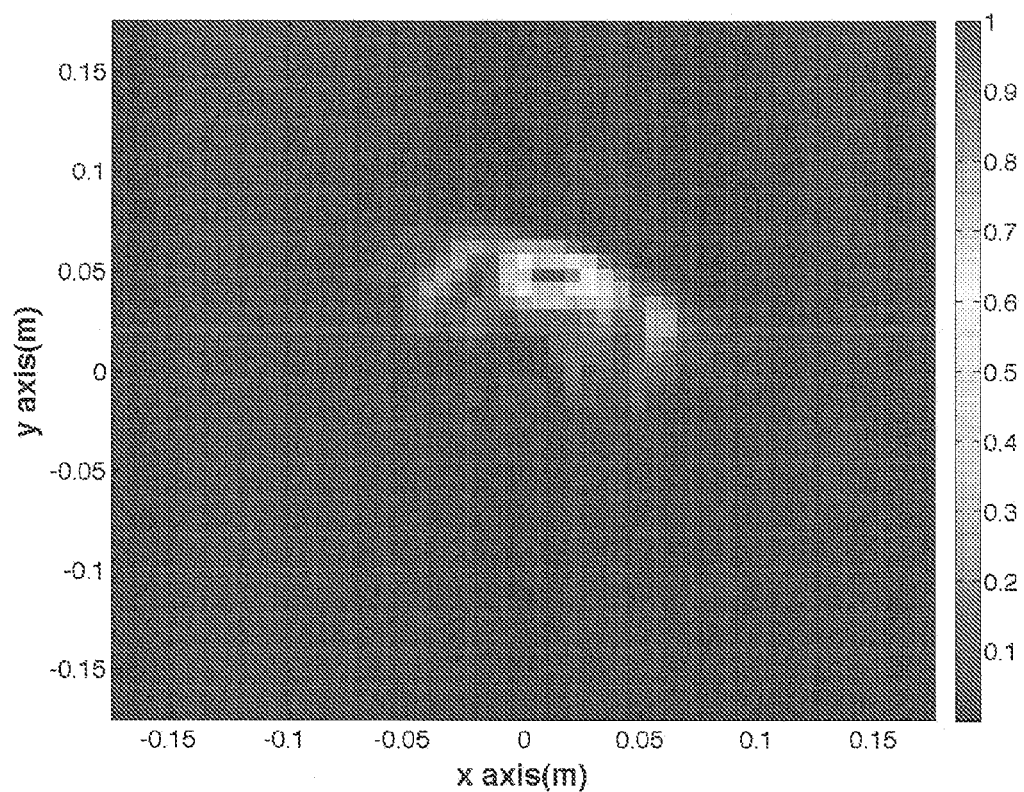
Figure 8D:
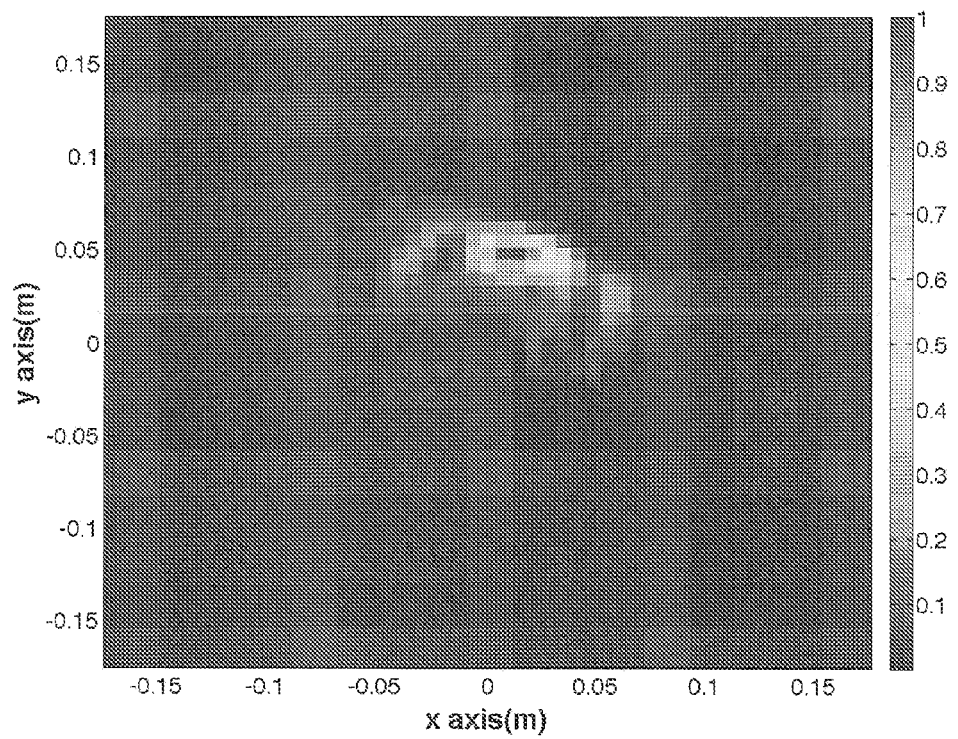
Figure 8E:
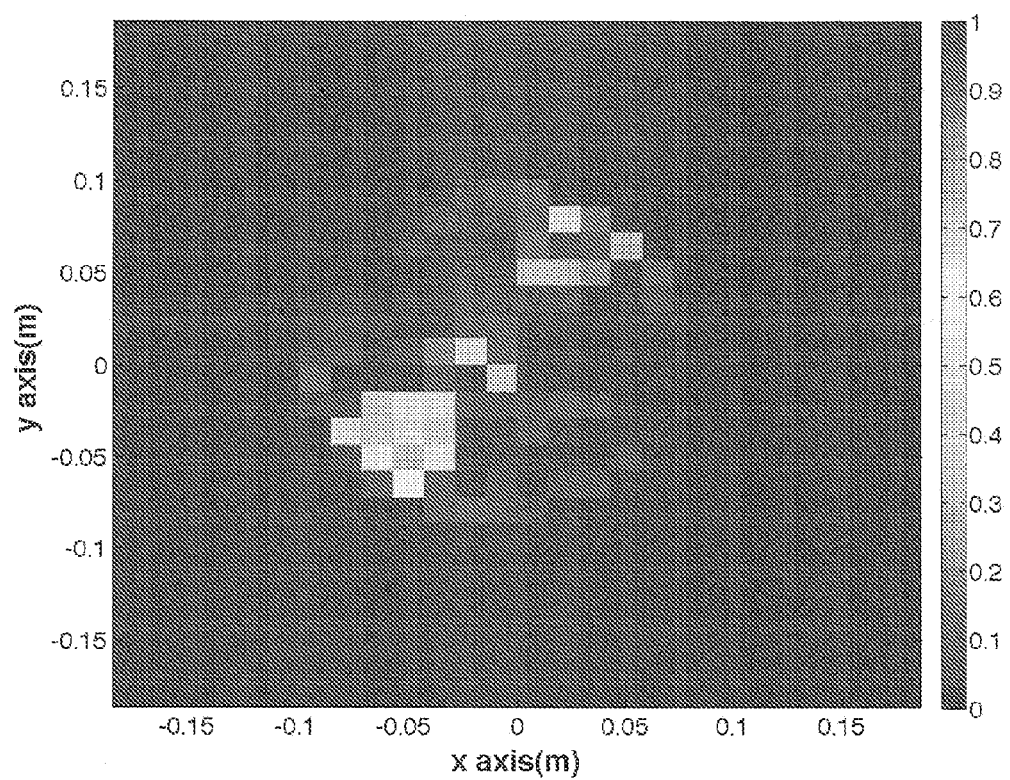

The experimental setup in experiment 4 is shown in FIG. 8(a). The yellow and gray region indicate the location and dimensions of the synthetic fibroglandular and tumor regions respectively. The image produced by the proposed approach is shown in FIG. 8(b). The results of using the Qhull approach and the CPU version of the proposed approach are shown in FIGS. 8(c) and 8(d). The SNR values of these images are 5.58 and 5.57 dB respectively. The image generated by the confocal mapping approach is shown in FIG. 8(e). This image has a SNR of 2.13 dB. The SNR values from the images formed using the confocal mapping approach are consistent with the values reported in previous studies, for example as described in Sorensen, T., Atkinson, D., Schaeffter, T., and Hansen, M. noted above. Additionally, note how there are no high magnitude artifacts in the images formed using a wavefront reconstruction based approach. The locations and position error of the target signatures in each experiment are shown in Table III. The SNR values are summarized in Table IV. The RMS error between the proposed method, the Qhull approach and the confocal mapping algorithm are displayed in Table V. The execution times for each dataset using the proposed method, its CPU counterpart and the Qhull approach are illustrated in Table VI.

CONCLUSIONS

According to the present invention, a real time 3D reconstruction approach for radar datasets recorded in near field cylindrical scan geometries is proposed. The proposed algorithm is based on a novel interpolation technique that does not require a triangulation procedure, reducing its computational complexity. Since the proposed technique is easily parallelizable, it was implemented on a GPGPU platform in order to take advantage of the arithmetic capabilities and memory bandwidth of these devices. The performance of the proposed method was assessed using experimental data sets collected from phantoms that mimic cylindrical radar imaging scenarios with high and moderate dielectric contrast between the propagation media and the targets.

Compared with the results obtained using the Qhull approach, the images generated by the proposed technique using experimental datasets had a similar spatial accuracy and SNR values, and a reduced execution time. The proposed method generates images with noticeable improvements in SNR and spatial accuracy. Furthermore the proposed method did not introduce any discernible artifacts in the reconstructed datasets. The acceleration provided by the GPGPU platform solved one of the most important shortcomings of wavefront reconstruction approaches when compared to confocal mapping methods, which was their longer execution time.

The proposed approach is capable of generating 3D images in real time for datasets with dimensions similar to the ones used in BMR and MWI scenarios. When executed on a single GPU, the proposed approach achieved a speed improvement of 160 times compared to conventional interpolation techniques for non-evenly sampled spaces, and 28 times compared with its CPU based counterpart. Additionally, a second implementation of the proposed algorithm that uses two GPGPU devices yielded a speed improvement of 2.05 times compared to the single GPGPU version, suggesting the potential of multi-GPGPU platforms.

In the following TABLE I, the relative permittivity values of the materials used in the phantom structure and support base are represented.

| Material | Permittivity Value (3 GHz) |
|---|---|
| PVC | 3.2 |
| Air | 1 |
| Maple wood | 1.55-1.7 |
| Agar-Corn Syrup Gel | 32 |
| Glycerin | 8.9 |
| Fructose-saline mixture | 53 |
| Canola oil | 2.5 |
| Styrene-acrylonitrile | 2.6 |

In the following TABLE II, the execution times of the 3D wavefront reconstruction approach for cylindrical scan geometries using the Qhull approach and the CPU, single GPU and multi-CPU versions of the proposed approach are represented in which all times are in seconds.

| | Size | | | |
|---|---|---|---|---|
| Technique | 127 × 72 × 11 | 251 × 72 × 11 | 501 × 150 × 16 | 1001 × 150 × 16 |
| Qhull | 7.81 | 27.5 | 465.47 | 1004.67 |
| Proposed method CPU | 1.65 | 3.85 | 39.56 | 190.8 |
| Proposed method single GPU | 0.034 | 0.124 | 1.52 | 4.34 |
| Proposed method dual GPU | 0.016 | 0.060 | 0.74 | 2.11 |

In the following TABLE III, the spatial error values obtained in each experiment are represented.

| Target | Target location (cm) | Qhull error (mm) | Proposed method error (mm) | CPU-LUT error (mm) | Confocal mapping error (mm) |
|---|---|---|---|---|---|
| 1a | −0.5, 2.2, 10 | 1.8, 2, 0.5 | 1.8, 2, 0.5 | 1.8, 2, 0.5 | −0.1, 28, 20 |
| 2a | 2.6, 0.63, 12 | 1.2, 0.3, 0 | 1.2, 0.3, 0 | 1.2, 0.3, 0 | 23, 16, −40 |
| 2b | −2.1, .63, 12 | 1, 0.3, 0 | 1, 0.3, 0 | 1, 0.3, 0 | 0.1, 50, −40 |
| 3a | 2.6, 0, 11 | 1.2, 0, 0 | 1.2, 0, 0 | 1.2, 0, 0 | 0, 14. −30 |
| 3b | 0, 2.6, 5.5 | 0, 1.2, 5 | 0, 1.2, 5 | 0, 1.2, 5 | 0.5, 2.4, 25 |
| 4a | 4.26, 1.7 | 5, 0.2 | 5, 2 | 5, 2 | 13, 3 |

In the following TABLE IV, the SNR values in each experiment are represented.

| Experiment | Qhull | Proposed method | CPU-LUT | Confocal mapping |
|---|---|---|---|---|
| 1 | 8.77 dB | 8.81 dB | 8.8 dB | 2.94 dB |
| 2 | 8.48 dB | 8.5 dB | 8.48 dB | 3.36 dB |
| 3 | 6.45 dB | 6.72 dB | 6.7 dB | 2.93 dB |
| 4 | 5.58 dB | 5.57 dB | 5.57 dB | 2.13 dB |

In the following TABLE V, the RMS difference values in each experiment are represented.

| Experiment | Qhull | Confocal mapping |
|---|---|---|
| 1 | 2.5e−4 | 2e−3 |
| 2 | 7.85e−5 | 2.2e−3 |
| 3 | 1.14e−4 | 2.8e−3 |
| 4 | 1.72e−6 | 2.7e−3 |

In the following TABLE VI the execution times in each experiment are represented in which all times are measured in seconds.

| Experiment | Single GPU | Dual GPU | CPU-LUT | Qhull | Confocal Mapping |
|---|---|---|---|---|---|
| 1 | 0.69 | 0.33 | 16.7 | 309.21 | 3.2 |
| 2 | 0.70 | 0.34 | 17.5 | 310.45 | 3.35 |
| 3 | 0.70 | 0.34 | 17.3 | 310.71 | 3.15 |
| 4 (1 plane only) | 0.046 | 0.024 | 1.3 | 20.6 | 0.18 |

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method of reconstructing collected data acquired in a three dimensional cylindrical radar scan geometry in which targets are considered to be at near field distances and where the scan planes are defined along a z axis, scan locations are arranged in a circular pattern with a radius R at each plane, an irradiating antenna is facing towards a center of each scan plane, and a waveform f(t) with a prescribed bandwidth is sequentially radiated from each scan location, the method comprising:

expressing a received signal from each scan location (R, θ, z) as:

$$s(t, \theta, z) = \sum_{q=1}^{T} \sigma_q f\left(t - \frac{2D_q(\theta, z)}{v}\right)$$

where v is the propagation speed, $\sigma_q$ and $(r_p, \phi_q, z_p)$ are the reflectivity and location of the $q^{th}$ target and $$D_q(\theta, z) = \sqrt{R^2 + r_q^2 + (z_q - z)^2 - 2Rr_q\cos(\phi_q - \theta)};$$

calculating a Fourier transform along the t, z and θ directions of said received signal;
applying a filter such that a resulting compensated dataset $U(\omega, \in, k_z)$ is expressed as:

$$U(\omega, \varepsilon, k_z) = \sum_{q=1}^{T} 4\sigma_q \cdot \xi(\omega, \varepsilon, k_z) \cdot \exp\left(-j\left(\sqrt{(4k^2 - k_z^2)r_q^2 - \varepsilon^2}\right) + \right.$$
$$\left. \varepsilon \cdot \sin^{-1}\left(\varepsilon / \sqrt{(4k^2 - k_z^2)r_q^2}\right) + \varepsilon\phi_q + k_z z_q\right)$$

where $\in$ and $k_z$ are the spatial frequency counterparts of θ and z respectively and $\xi(\omega, \in, k_z)$ is the spectrum amplitude component in the $(\omega, \in, k_z)$ frequency space;
applying a mapping function to the resulting compensated dataset to produce a sampled frequency space denoted as $I(k_{ux}, k_{uy}, k_z)$;
interpolating values of $I(k_{ux}, k_{uy}, k_z)$ at points defined in $(k_x, k_y, k_z)$; and
calculating a three dimensional inverse Fourier transform of $I(k_x, k_y, k_z)$ to yield a three dimensional model i(x, y, z).

2. The method according to claim 1 including transferring data from the $(\omega, \in, k_z)$ frequency space to the $(k_x, k_y, k_z)$ spatial frequency space where $k_x$ and $k_y$ are spatial frequency counterparts of x and y spatial domains.

3. The method according to claim 2 including obtaining the inverse Fourier transform of:

$$U(\omega, \varepsilon, k_z) = \sum_{q=1}^{T} 4\sigma_q \cdot \xi(\omega, \varepsilon, k_z) \cdot \exp\left(-j\left(\sqrt{(4k^2 - k_z^2)r_q^2 - \varepsilon^2}\right) + \right.$$
$$\left. \varepsilon \cdot \sin^{-1}\left(\varepsilon / \sqrt{(4k^2 - k_z^2)r_q^2}\right) + \varepsilon\phi_q + k_z z_q\right)$$

along $\in$ yielding the spectrum denoted as $S_e(\omega, \theta, k_z)$ performing the following mapping functions:

$$k_{ur} = \sqrt{4(\omega/v)^2 - k_z^2}$$

$$k_{ux} = k_{ur} \cdot \cos(\theta)$$

$$k_{uy} = k_{ur} \cdot \sin(\theta).$$

4. The method according to claim 3 including defining an evenly sampled frequency space $(k_x, k_y, k_z)$ as follows:

$$k_x = k_y = n\pi/R \text{ for } -N \leq n \leq N \text{ and } n \in \Box; \text{ and}$$

$$k_z = m \cdot 2\pi/(M \cdot \Delta z) \text{ for } 0 \leq m \leq M-1 \text{ and } m \in \Box;$$

where Δz is the space between adjacent planes the z direction.

5. The method according to claim 1 including interpolating values of $I(k_{ux}, k_{uy}, k_z)$ at points defined in $(k_x, k_y, k_z)$ by:
- defining an auxiliary function $p(k_r, k_z)=\sqrt{k_r^2+k_z^2}$ where $k_r=l\cdot 2\pi/(L\cdot\Delta t)$ for $0\leq l\leq L-1$ and $l\in\square$ and $\Delta t$ is a sampling rate of the waveform $f(t)$;
- yielding an intermediate spectrum $\overline{U}(\omega, \theta, k_z)$ by interpolating components $U(\omega, \in, k_z)$ at points specified in their corresponding $(p(k_r, k_z), k_z)$ values;
- determining polar coordinates of each point in $(k_x, k_y)$; and
- calculating values of $\overline{U}(\omega, \theta, k_z)$ at points contained in an auxiliary discrete frequency space using an interpolation approach that considers evenly sampled data points.

6. A method of interpolating in the reconstruction of data acquired in a three dimensional cylindrical radar scan geometry, the method comprising:
- defining an auxiliary function $p(k_r, k_z)=\sqrt{k_r^2+k_z^2}$ where $k_r=l\cdot 2\pi/(L\cdot\Delta t)$ for $0\leq l\leq L-1$ and $l\in\square$ and $\Delta t$ is a sampling rate of a waveform $f(t)$ radiated from a scan location of the scan geometry;
- yielding an intermediate spectrum $\overline{U}(\omega, \theta, k_z)$ by interpolating components $U(\omega, \in, k_z)$ at points specified in their corresponding $(p(k_r, k_z), k_z)$ values;
- determining polar coordinates of each point in $(k_x, k_y)$; and
- calculating values of $\overline{U}(\omega, \theta, k_z)$ at points contained in an auxiliary discrete frequency space using an interpolation approach that considers evenly sampled data points.

7. The method according to claim 6 including displaying the reconstructed data in the spatial domain.

8. The method according to claim 6 including implementing the method on a general purpose graphics processing unit.

9. The method according to claim 6 including determining the polar coordinates of each point in $(k_x, k_y)$ using the following equations:

$$\psi(k_x, k_y) = \sqrt{k_x^2 + k_y^2}\text{; and}$$

$$\vartheta(k_x, k_y) = \begin{cases} \tan^{-1}(k_x/k_y) & \text{if } k_x > 0 \text{ and } k_y \geq 0 \\ \tan^{-1}(k_x/k_y) + 2\pi & \text{if } k_x < 0 \text{ and } k_y \geq 0 \\ \tan^{-1}(k_x/k_y) + \pi & \text{if } k_x < 0 \text{ and } k_y < 0 \\ \pi/2 & \text{if } k_x = 0 \text{ and } k_y > 0 \\ 3\pi/2 & \text{if } k_x = 0 \text{ and } k_y < 0 \\ 0 & \text{if } k_x = 0, k_y = 0 \end{cases}.$$

10. The method according to claim 9 including defining the auxiliary discrete frequency space $(\rho,\phi)$ where $\rho$ and $\phi$ exist in the ranges $\psi(k_x, k_y)$ and $\theta(k_x, k_y)$ respectively.

11. The method according to claim 6 including applying the following mapping function:

$$I(\alpha(\rho, \phi), \beta(\rho, \phi), k_z) = \overline{U}(\rho, \phi, k_z)$$

where $\alpha(\rho, \phi)=\rho\cdot\cos(\phi)$ and $\beta(\rho, \phi)=\rho\cdot\sin(\phi)$.

12. The method according to claim 11 including regarding $I(\alpha(\rho, \phi), \beta(\rho, \phi), k_z)$ as a single plane in $I(k_x, k_y, k_z)$.

13. The method according to claim 11 including visualizing the reconstructed data by calculating the three dimensional inverse Fourier transform of $I(\alpha(\rho, \phi), \beta(\rho, \phi), k_z)$.

* * * * *